(12) United States Patent
Berestov et al.

(10) Patent No.: US 6,714,672 B1
(45) Date of Patent: Mar. 30, 2004

(54) AUTOMATED STEREO FUNDUS EVALUATION

(75) Inventors: Alexander L. Berestov, San Jose, CA (US); Harry T. Garland, Los Altos Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 09/590,516

(22) Filed: Jun. 9, 2000

Related U.S. Application Data

(63) Continuation-in-part of application No. 09/561,291, filed on Apr. 28, 2000, and a continuation-in-part of application No. 09/500,181, filed on Feb. 7, 2000, and a continuation-in-part of application No. 09/428,286, filed on Oct. 27, 1999.

(51) Int. Cl.7 .............................. G06K 9/00; A61B 3/14

(52) U.S. Cl. ...................... 382/154; 382/285; 351/206; 359/462; 356/12; 396/18

(58) Field of Search ................................. 382/154, 117, 382/218–220, 285, 294, 309, 274, 116, 118; 351/200, 201, 206, 221, 240; 359/462, 464–472; 356/12, 71; 345/419–427; 348/578; 396/18; 340/5.52, 5.82; 902/3, 6; 713/186

(56) References Cited

U.S. PATENT DOCUMENTS

| | | | | |
|---|---|---|---|---|
| 5,220,441 A | * | 6/1993 | Gerstenberger | 358/487 |
| 5,745,163 A | * | 4/1998 | Nakamura et al. | 348/46 |
| 6,075,905 A | * | 6/2000 | Herman et al. | 382/284 |
| 6,175,648 B1 | * | 1/2001 | Ayache et al. | 382/154 |
| 6,430,304 B2 | * | 8/2002 | Hanna et al. | 382/107 |
| 6,454,410 B1 | * | 9/2002 | Berger et al. | 351/206 |

OTHER PUBLICATIONS

Papadimitriou et al. "Epipolar Line Estimation and Rectification for Stereo Image Pairs" Apr. 1996. IEEE Transactions on Image Processing. vol. 5, Issue 4. pp. 672–676.*

"Stereo fundus photography: automatic evaluation of retinal topography", A. Berestov, Proceedings of SPIE, vol. 3957, Jan., 2000, pp. 50–59.

Yogesan, K., Eikelboom, R., and Barry, C. Colour Matching of Serial Retinal Images. Lions Eye Institute and Centre for Ophthalmology and Visual Science [online], Feb. 1999 [retrieved on Jun. 27, 2000]. Retrieved from the Internet:<URL: http://www.general.uwa.edu.au/u/robeik/OSA99/>.

Woods, A. et al;. *Image Distortions in Stereoscopic Video Systems*, SPIE vol. 1915 Stereoscopic Displays and Applications, pp 36–48, IV (1993).

* cited by examiner

*Primary Examiner*—Jayanti K. Patel
*Assistant Examiner*—Aaron Carter
(74) *Attorney, Agent, or Firm*—Fitzpatrick, Cella, Harper & Scinto

(57) ABSTRACT

A computer-implemented method and system for adjustment and matching of stereoscopic images (206, 208) of the eye fundus (106). Illumination errors between the images are eliminated, such as by adjusting groups of pixels so that the mean and variance of a group (306) from the left image (206) will have the same mean intensity and variance as the corresponding group (308) from the right image (208). An epipolar line adjustment is performed, such as by shifting points in the images based on matched points in the images. Image occlusion errors are detected and removed, such as by matching point analysis. Once these adjustment steps have been completed, a matching analysis can be preformed using the corrected images.

16 Claims, 23 Drawing Sheets

(14 of 23 Drawing Sheet(s) Filed in Color)

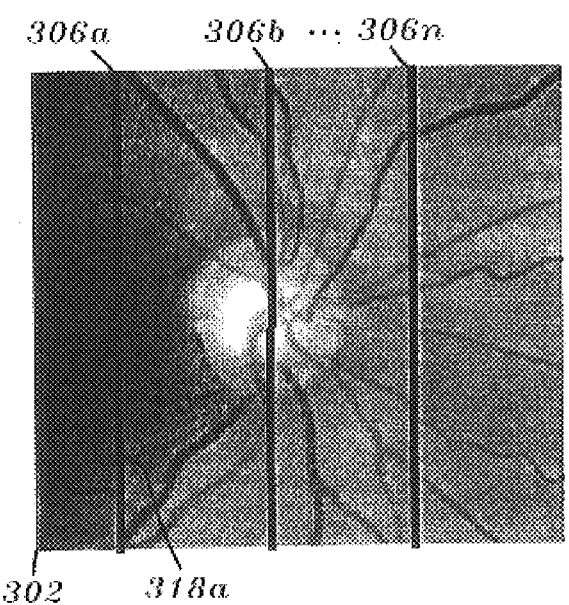 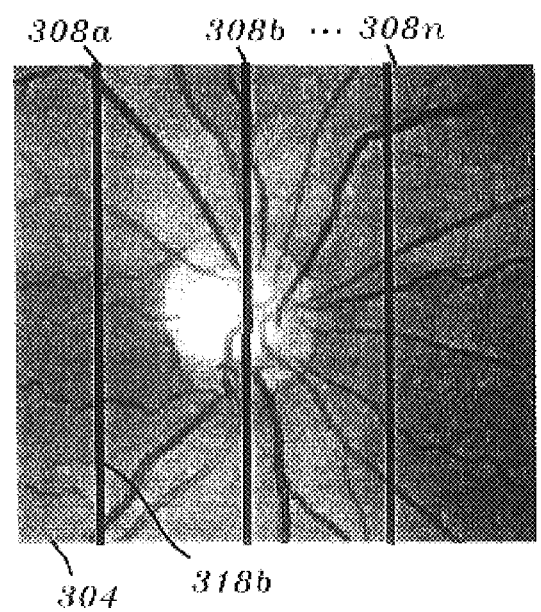
FIG. 3a  FIG. 3b

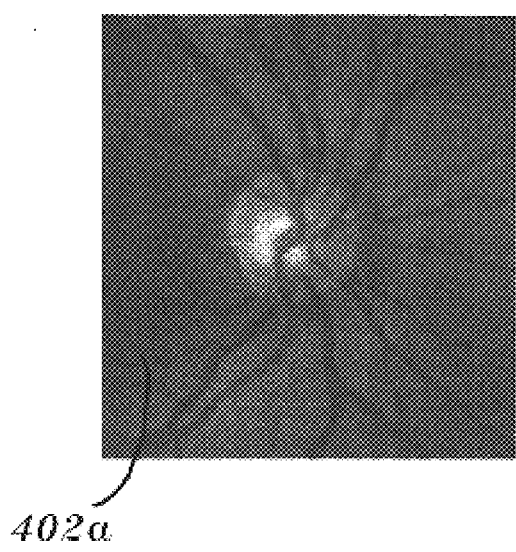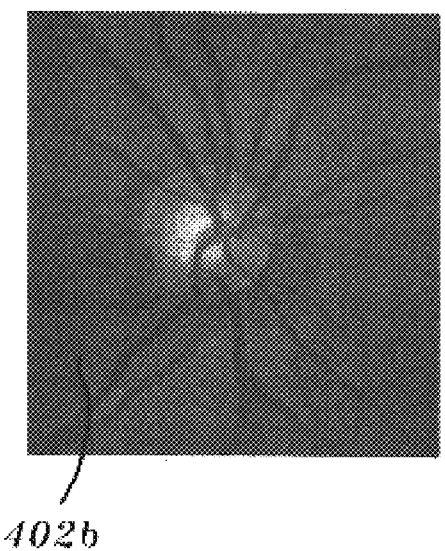
FIG. 4a　　　　　FIG. 4b

AUTOMATED STEREO FUNDUS EVALUATION

RELATED APPLICATIONS

This application is a continuation-in-part of commonly owned application Ser. No. 09/428,286, titled "Fast Epipolar Line Adjustment of Stereo Pairs," filed on Oct. 27, 1999, by Alexander Berestov. This application is also a continuation-in-part of commonly owned application Ser. No. 09/500,181, titled "Detection and Removal of Image Occlusion Errors," filed on Feb. 7, 2000, by Alexander Berestov. This application is also a continuation-in-part of commonly owned application Ser. No. 09/561,291, titled "Stochastic Adjustment of Differently-Illuminated Images," filed on Apr. 28, 2000, by Alexander Berestov. The content of each of these applications is hereby incorporated by reference into the present application.

BACKGROUND OF THE INVENTION

1. Field of the Invention

The present invention relates generally to computer-implemented adjustment and matching of stereoscopic images of the eye fundus.

2. Description of Background Art

Retinal photography has long been an important tool for general ophthalmology, but the necessity of using traditional still photography has made analysis and detection of pathologies both time-consuming and subject to human error.

Telemedicine systems such as the "Ophthalmic Imaging Network" developed by Ophthalmic Imaging Systems, Inc., of Sacramento, Calif., are still in the experimental phase. They offer physicians a system for evaluating a patient's retinal status. Using these systems, a single computerized retinal image is captured in the physician's office and is electronically transmitted to a reading center, where it is analyzed, and the results returned to the physician for evaluation. However, this scheme requires experienced and certified readers, and involves a significant degree of error, resulting in the need for images having to be reread.

The automated evaluation of eye fundus topography and other features associated with severe ophthalmology diseases such as diabetic retinopathy and glaucoma could save millions of people from blindness.

Diabetic retinopathy alone is the number two leading cause of blindness in the United States, after macular degeneration, causing 10% of new cases of blindness each year. Diabetes is a common disease affecting about 2% of the population. Of these cases, 10–15% are insulin dependent (type 1) diabetics, and the remainder are non-insulin-dependent (type 2) diabetics. After living with diabetes for 20 years, nearly all patients with type-1 diabetes and over 60% of patients with type-2 diabetes show some degree of retinopathy. A diabetic is 25 times more likely to go blind than is a non-diabetic. Because of this increased risk, diabetics require periodic retinal screening, which should be part of the routine care of all patients, because it can significantly reduce the risk of developing diabetic eye disease.

Another disease of the eye is glaucoma. Almost 80,000 Americans are blind as a result of glaucoma, and another one million are at risk for vision loss and may not even be aware of the risk. It fact, glaucoma is one of the leading causes of preventable blindness in the United States, and the single-most common cause of blindness among African-Americans. Glaucoma is often called the "sneak thief" of sight because the most common type causes no symptoms until vision is already damaged. For that reason, the best way to prevent vision loss from glaucoma is to know its risk factors and to have medical eye examinations at appropriate intervals.

However, with the telemedicine systems of today requiring human reading, it is difficult to achieve regular, accurate, and inexpensive screening of diabetics and people at risk for glaucoma and other diseases.

The most important parameter in retinal examination is fundus topography. For this reason, ophthalmologists prefer to analyze fundus images in stereo. For example, it is impossible to see diabetic macula edema, which is the swelling of the most sensitive area of the retina, without stereo photographs. Cystoid foveal changes at the central focusing area of the retina are also difficult to detect without a stereo view. Changes to the optic nerve due to glaucoma are also hard to observe using just one picture. Using a stereo image pair, however, 3D information can be extracted from the images and used for imaging and measurements of fundus topography.

At present, automated evaluation of fundus topography is performed with scanning laser systems, which use multiple laser scans to render 3D volumes and extract depth information for the fundus features. One of the products available on the market is the TOPSS scanning laser tomography system of Laser Diagnostic Technologies, Inc., of San Diego, Calif. The system is a multiple-purpose tomograph for imaging and measurement of fundus topography. The system can image and measure topographic features and changes of the optic nerve head, macula holes, tumors, and edemas. With respect to digital images, it is able to enhance image visualization, make volumetric measurements, draw topographic profiles and compare images. However, while scanning laser systems are able to provide reliable information about retinal topography, they are very expensive and use narrow laser beams, which may be harmful to the eye. It would be desirable to extract the same information at low cost from regular stereo photographs made with digital fundus cameras. However, this requires extraction of 3D information from 2D photographs. This is made difficult or impossible by differences in illumination between images, and stereoscopic distortions leading to an inability to match points in one image to corresponding points in other images, as further described below.

Usually, stereo photographs of the human eye fundus are taken with one camera shifted by a small distance, illuminating the fundus through the pupil as illustrated in FIG. 1. The shape of the eye fundus is generally spherical, so the difference in color and brightness between stereo images depends on the position of the camera, which illuminates the fundus through the pupil at different angles. For example, FIGS. 2a and 2b show a left and a right image of an ocular nerve, respectively. In the figures, the left part of the left image in FIG. 2a is darker than the left part of the right image in FIG. 2b, and the right part of the right image is darker than the right part of the left image. In order to be able to perform a matching analysis on the images and create a topographical representation of the fundus, these illumination errors must be substantially reduced or eliminated. In addition, it is often desirable to compare two images of the same fundus taken at different times, or with different cameras. This additionally presents a situation where the illumination in each image may be different, requiring correction before appropriate analysis can take place.

It is possible to adjust the brightness, contrast and color of two images using a histogram adjustment method, as proposed by Kanagasingam Yogesan, Robert H. Eikelboom and Chris J. Barry in their paper, "Colour Matching of Serial Retinal Images," Lions Eye Institute and Centre for Ophthalmology and Visual Science, Perth, Western Australia, Australia, published in "Vision Science and its Applications," *OSA Technical Digest* (Optical Society of America, Washington D.C., 1999, pp.264–267), which is incorporated by reference herein in its entirety. In their paper, the authors propose a color-matching algorithm that equalizes the mean and standard deviation of each of the three colors in the image. First, the entire image is split into the colors red, green and blue; the mean and standard deviation are calculated, and then the histograms of both images are adjusted to equalize the images. The color image is reconstituted by recombining the three channels. The problem with this method of adjustment is that the equalization adjustment is made for the whole image, so the differences in illumination within the images remain unchanged. For example, consider the points 202a and 202b in FIGS. 2a and 2b, respectively. From the figures, it can be seen that point 202a is much darker than point 202b. However, since 202a and 202b actually are the same point on the eye fundus, both points should ideally be illuminated equivalently. Because the Kanagasingram et al. method uses a histogram to adjust the brightness of the whole image, if FIG. 2a were lightened, for example, points 202a and 202b might end up being equally bright, but point 204a, which was originally lighter than point 204b, would now be even brighter, causing increased differences in illumination between the points 204a and 204b. Thus, adjusting the entire image to compensate for different illumination is not a satisfactory solution. What is needed is a way of adjusting differently illuminated images of an eye fundus to compensate for different lighting conditions, so that accurate matching can be performed.

Epipolar Line Adjustment

In addition, for both real-world and computer-generated imaging applications, there is a growing need for display techniques that enable determination of relative spatial locations between objects in an image. This is particularly helpful for extracting the 3D topographical information from the stereo image pairs.

One method used to determine spatial relations between objects is binocular stereo imaging. Binocular stereo imaging is the determination of the three-dimensional shape of visible surfaces in a static scene by using two or more two-dimensional images taken of the same scene by two cameras or by one camera at two different positions. Every given point, A, in the first image has a corresponding point, B, in the second image, which is constrained to lie on a line called the epipolar line of A. As soon as the correspondence between points in the images is determined, it is possible to recover a disparity field by using the displacement of corresponding points along the epipolar lines in the two images. For example, if two cameras are parallel, the disparity is inversely proportional to the distance from the object to the base line of the cameras, and the general equation in this case is:

$$D=fb/Z. \quad (1)$$

Here, D is the disparity, f is the focal length of the cameras (it is the same for both cameras), b is the distance between cameras (the base), and Z is the distance from the object to the baseline. Thus, disparity approaches zero as depth approaches infinity. Once the disparity field is generated and the points in the images are matched, the spatial characteristics of the objects in the images can be calculated using Euclidean geometry.

A related problem in the field of stereo imaging is object recognition and localization. Object recognition and localization includes identifying an object or a particular class of objects, such as identifying a chair, and determining the location of the object in order to maneuver or manipulate the object accordingly. One of the first steps in computer object recognition is connecting as much information as possible about the spatial structure of the object from the analysis of the image. The spatial structure of the object is also important for many other applications, such as three-dimensional object modeling, vehicle navigation and geometric inspection.

Unfortunately, it is very difficult to recover three-dimensional information from a set of 2D images as this information was lost when the two dimensional image was formed.

Most algorithms assume that the epipolar lines are given a priori, and thus pose the stereo matching problem as a one-dimensional search problem. In order for such an assumption to work, the two cameras must be set mechanically to have parallel optical axes such that the epipolar lines are horizontal in both images. However, even if one tries carefully to arrange the imaging geometry in such a way, there is still some degree of error, and the corresponding points are not strictly on the same horizontal lines. In the general case, calibration is necessary to recover the epipolar geometry accurately. Possible reasons that the pixels in one image do not have matching pixels lying along the same row are that the optical axes are not parallel, the base line is not horizontal, the sensors that are used to create the image do not coincide, or the cameras have different lens distortion, etc.

The matching problem can be simplified to a one-dimensional problem if the underlying epipolar geometry were known. What is further needed, then, is a system and method for determining the epipolar geometry between two or more images; as well as a system and method for aligning the images to the same epipolar line to complete the transformation.

Occlusion Detection

Another major obstacle to properly matching points in the images is caused when occluding contours coincide. Occluding contours coincide when a point that is visible in the right image is not visible in the left image, and therefore does not really have a matching point. Alternatively, occluding errors can also occur at the borders or edges of an object that are captured by a camera facing the object at different angles (called "occluding boundaries"). This is caused by the traditional correspondence procedure which will be described in further detail below.

The most standard situation where occluding contours occur is when other objects in the scene block the point of interest. When this occurs, area-based matching algorithms often give wrong disparity estimates near the contour. When the classical stereo correlation technique is applied and the search is made in the left image, the contour usually "leaks" to the right of the object boundary as illustrated in FIG. 16. Another set of errors is shown in the top left corner of FIG. 16 and is associated with out-of-focus objects that cannot be matched correctly.

The conventional solutions used to successfully detect occlusions and avoid false correspondence require three or more cameras. In the simplest case, several cameras may be used to capture an image of the scene from equal angles along a hemisphere that surrounds the scene. Thus, if a point is not included in the second image, the first image may be matched to the third image and used to "complete" the occluded area in the second image. If not positioned properly, however, multiple camera stereos can increase the area of occlusion and may still lead to false correspondence. More specifically, depth maps generated from a polynocular stereo image often have blurred object shapes caused by the false correspondence at occluding boundaries.

Another set of solutions involves creative manipulation of a matching algorithm. Some matching algorithms may be better at avoiding false correspondence problems, but none solves the problem completely. For example, feature-based matching algorithms, which try to correspond points only at object edges, may be used to avoid occlusion to an extent. Other binocular stereo algorithms have also been adapted to try to detect "half-occluded" regions in order to improve the correspondence search. In both cases, however, the algorithms fail to measure the depth in these regions. More recently, new algorithms were developed for multiple camera devices, which may provide better results in occlusion detection.

In each conventional solution, either multiple cameras are needed to prevent occluded regions or the method is extremely time intensive and, in both cases, the resulting correspondence errors prevent creation of a complete depth map of the scene. Using multiple cameras increases the cost, burden and complexity of the imaging system, and the resulting images are still not amenable to depth analysis. It would be desirable, therefore, to have a new method for detecting and eliminating occlusions and out-of-focus errors thereby enabling the creation of an accurate depth map of the scene without requiring significant time and effort to accomplish.

Thus, what is needed is a system and method for accurately recovering the topography of an eye fundus from 2D stereo images of the fundus.

DISCLOSURE OF INVENTION

In accordance with the present invention, there is provided a system and method for automated adjustment of images of the eye fundus. First, the images are adjusted to compensate for differences in illumination. Next, an epipolar line adjustment is made to correct for vertical displacement errors. Image occlusion errors are then detected and removed, and a matching algorithm can then be run to recreate a topographical map of the fundus from the stereo image pair.

The first step requires adjusting differently illuminated images of an eye fundus (106) to reduce and eliminate illumination errors. In one embodiment, two or more images (206, 208) are obtained by an image-receiving device (502) that is coupled to a processing computer (500). In another embodiment, the images exist on film or paper, and are converted into computer-readable form by a scanning device. Pixels within each image are assigned to groups (306, 308) of a selected width. Each group forms a line through the image. The lines may be either straight or curved, although a selection of longitudinally curved lines allows for greater reduction in illumination errors. Each group (306) in the first image (302) is associated with a corresponding group (308) in the other images. Next, the intensity level for at least one color channel is determined for each pixel in each group (306, 308). From this data, the mean intensity level for each group (306, 308) is then determined. In one embodiment, the variance of each group (306, 308) is additionally determined. The mean intensity levels for each group (306, 308) are compared in each image (302, 304), and the intensity level of pixels in one or more images are then adjusted so that the $n^{th}$ group in each image will have approximately equal mean intensity levels.

The next step involves determining the epipolar geometry between two or more images (910), (920) taken of the same scene. First, points in the images (910), (920) are matched using an enhanced matching method (1300). This method (1300) provides highly accurate matching results in an efficient manner.

Once the points are matched, the images (910), (920) are adjusted so that the epipolar geometry of both images (910), (920) are aligned. The images (910), (920) may then be combined into a single stereo image. The present invention can then use other stereo imaging methods to provide alternate views of the same object, thereby enabling determination of object characteristics, such as size and distance.

The next step is the elimination of correspondence errors associated with image occlusions. In one embodiment of the invention, the method first applies traditional correspondence methods for matching points in two images, a left image 10A and a right image 10B, taken of the same scene. Ideally, the initial search is performed by matching each point (1710) in the right image 10B with a "best match" point (1720) in the left image 10A. Once an initial set of matching points (1710, 1720) is generated, a second search is performed by using the best match point (1720) in the right image 10B as the basis for an additional correspondence search in the left image 10A. While the first search was performed without restriction, the second search is explicitly limited by the starting point (1710) used in the first search. A second "best match" point (1730) is generated. The point (1730) generated in the second search may be the same point (1710) that was used in the first search or may be a different point altogether. This results in a second set of points that represents the most accurate match between points.

As will be further described below with reference to FIG. 17, limiting the search window on the second search results from the way in which occlusions manifest themselves as errors during correspondence. More specifically, incorrectly matched points often cause leakage in a particular direction depending on the direction of image used in the first search. If the initial points used in the first search are points in the right image 10B being matched to the "left" image 10A, then the first search will generate good matches for points on the left edge of objects in the image, with a poor match on the right edge of the object. In this scenario, the second search will generate good matches for points on the right edge of any objects in the image. By placing the additional limitations on the second correspondence search, the poor match points on the left side of the object will be avoided while still picking up the correctly selected correspondence points on the right edge of the object. This limitation also speeds up the correspondence process significantly, as only a portion of the points in the row are used during the correspondence search. Thus, the best points from each of the searches are used to establish correspondence in the fastest possible fashion.

In another embodiment of the invention, the restrictions placed on the second search are removed and the resulting points used to accurately identify the occluded areas. These results may be used in conjunction with the results of the first embodiment to generate an error map that accurately identifies potentially problematic areas. More specifically, the results of correspondence search in the second embodiment avoid any "false positives" and can be used to further modify the results of the first embodiment.

Steps for removing any additional errors in the final images are also provided. For example, each stereo image could be broken down into separate images for each color coordinate. The correspondence search could be run on each image separately with the results used to create a separate disparity map for each color coordinate.

After the images have been adjusted as described, a conventional matching algorithm may be used to extract topographical information from the stereo image pairs in order to evaluate the eye fundus.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 3a and 3b are left and right images, respectively, of an ocular nerve with superimposed lines of pixels.

FIGS. 4a and 4b are illumination-corrected left and right images, respectively, of an ocular nerve.

DETAILED DESCRIPTION OF THE PREFERRED EMBODIMENTS

The present invention is directed toward a system and method for accurately recovering the topography of an eye fundus from 2D stereo images of the fundus. A preferred embodiment of the present invention is now described with reference to the figures where like reference numbers indicate identical or functionally similar elements.

Figure 22:
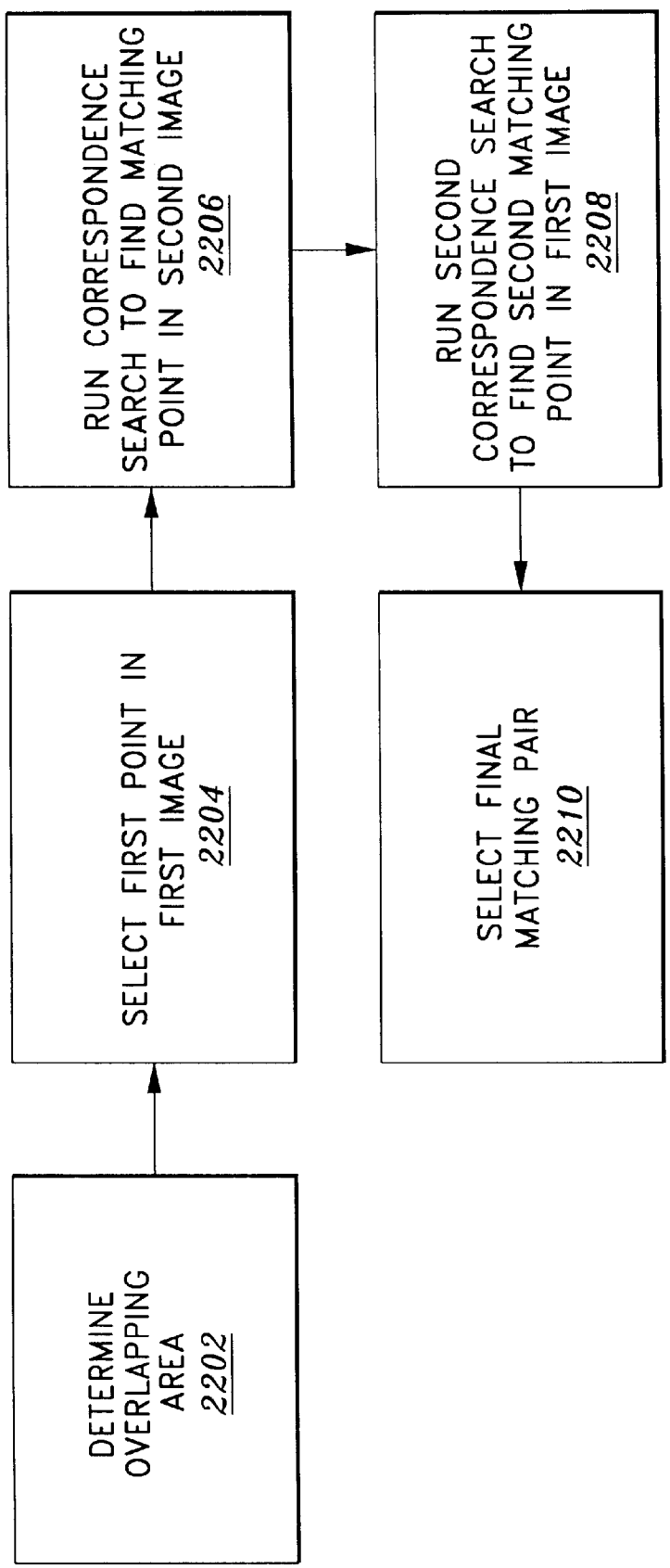
FIG. 22 is a flowchart illustrating a method of occlusion detection in accordance with an embodiment of the present invention.
Figure 23:
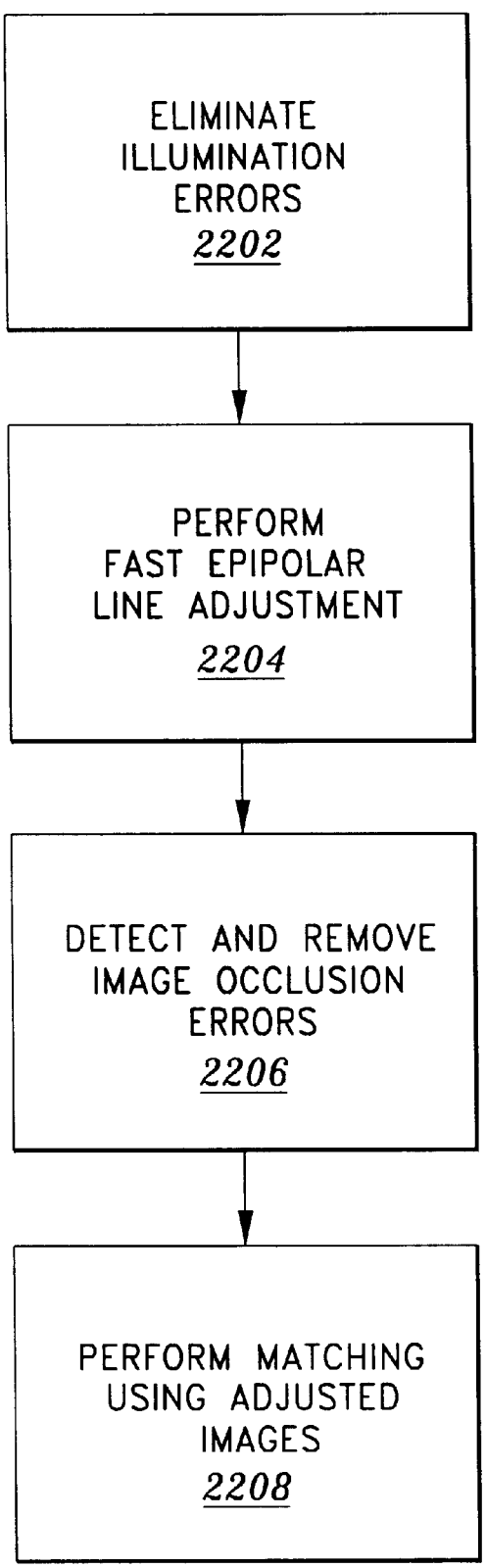
FIG. 23 is a flowchart illustrating the operation of an embodiment of the present invention.

Referring first to FIG. 23, there is shown a flow chart of the operation of an embodiment of the present invention. To obtain an automatic stereo fundus evaluation, illumination errors are first eliminated 2302, as is described in greater detail by FIG. 6. Next, a fast epipolar line adjustment is performed 2304, as illustrated at length in FIG. 13. Next, occlusion errors are detected and removed 2306, as can be seen in greater detail from FIG. 22, and matching can then be performed, 2308, using any number of matching algorithms as further described below.

Stochastic Illumination Adjustment

Figure 1:
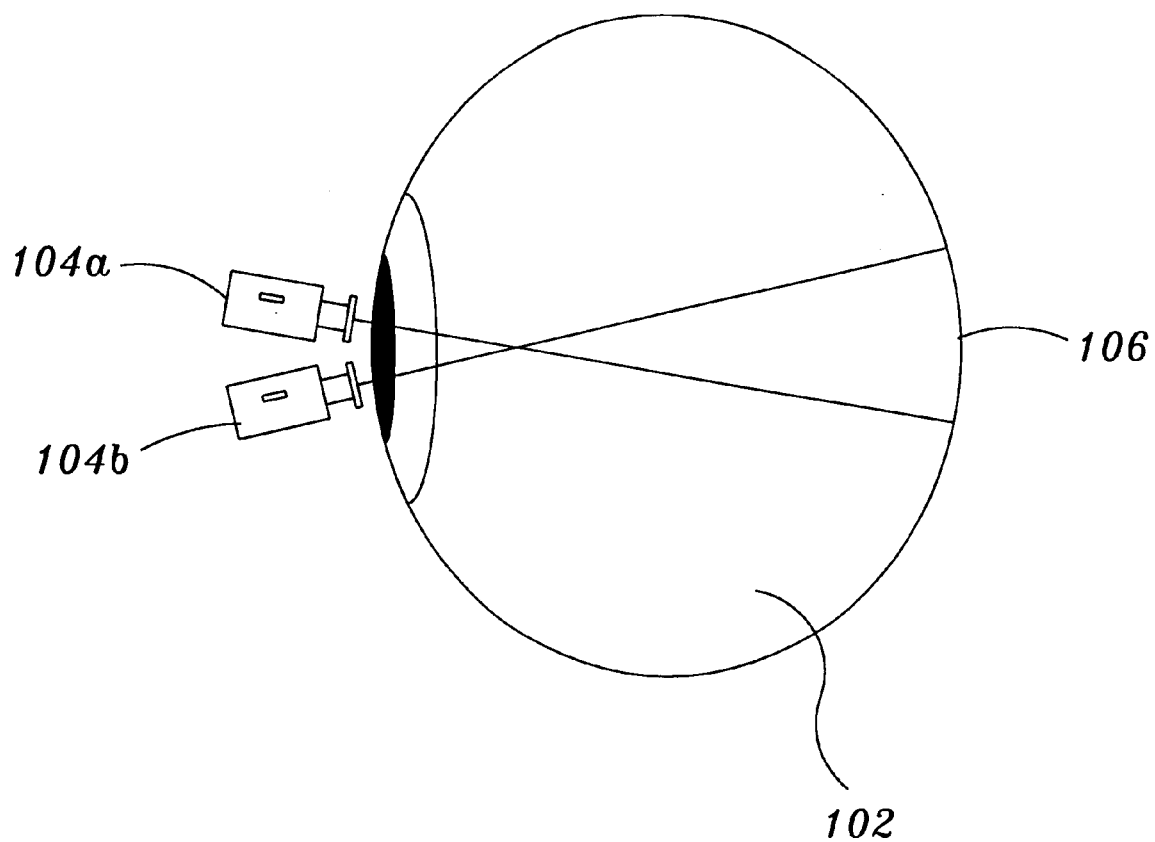
FIG. 1 is a diagram illustrating the illumination of a fundus from two different camera positions.

Referring now to FIG. 1, there is shown an eye 102, including a fundus 106, and a camera 104, the camera 104 being shown in two different positions 104a and 104b. For illustrative purposes, the camera 104 is shown as being in both locations 104a and 104b simultaneously. As can be seen from the figure, a light source attached to the camera and projecting a narrow beam of light that can penetrate through the pupil will not uniformly illuminate the eye 102, or portions thereof, e.g., the fundus 106, because of the narrowness of the beam of light. This non-uniform illumination results in the disparity in contrast and intensity described above.

Figure 2A:
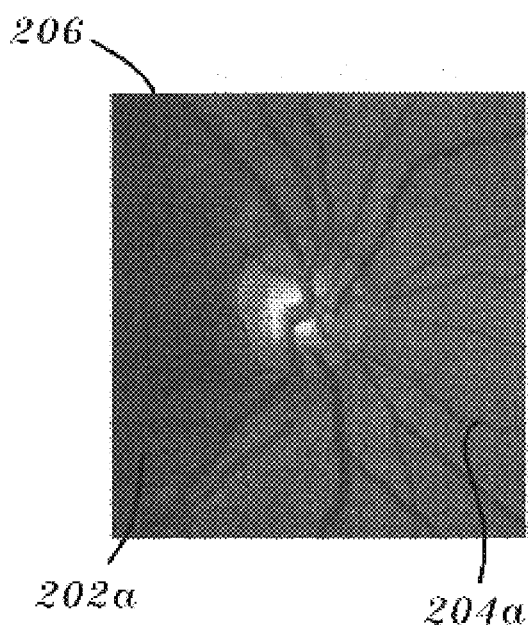
FIGS. 2a and 2b are left and right images, respectively, of an ocular nerve.
Figure 2B:

Referring now to FIGS. 2a and 2b, there are shown two images of the eye fundus. FIG. 2a is a left image and FIG. 2b is a right image. The images are photographs taken by a camera 104 designed for fundus imaging. One such camera is the TRC-NW5S by TOPCON American Corporation of Paramus, N.J. Those skilled in the art will appreciate that other cameras and imaging devices could be substituted for the TRC-NW5S, and may include, for example, film cameras, digital cameras, and video cameras. The images that are to be captured are, in a preferred embodiment, visible spectrum images, however infrared images and images displaying other spectrums may be used in alternative embodiments.

Referring now to FIGS. 3a and 3b, after the two images 206, 208 are captured, pixels within the images 206, 208 are separated into groups 306a, 306b, . . . 306n in the left image 302, and groups 308a, 308b, . . . 308n in the right image 304. In one preferred embodiment, pixels may be grouped so as to form a straight line, as illustrated in FIGS. 3a and 3b, while in another preferred embodiment, they may be grouped to form longitudinal lines. It yet other embodiments, pixels may be grouped in lines of other curvatures, but as those skilled in the art will recognize, because of the curved shape of the fundus 106, longitudinal lines will tend to result in more accurate elimination of illumination errors. One embodiment has the pixels grouped in straight lines perpendicular to the direction of movement of the camera 104. An alternative embodiment has the pixels grouped in longitudinal lines, with the lines perpendicular to the direction of movement at their point of intersection with the direction of movement. In still other embodiments, the pixels may be grouped into either straight or longitudinal lines that are not perpendicular as described above, although such a grouping may consequently result in removing fewer illumination errors. The pixels in a group 306 may be as narrow as one pixel, or as wide as the entire image. Those skilled in the art will recognize that narrower groups allow for greater accuracy in detecting illumination errors.

Figure 5:
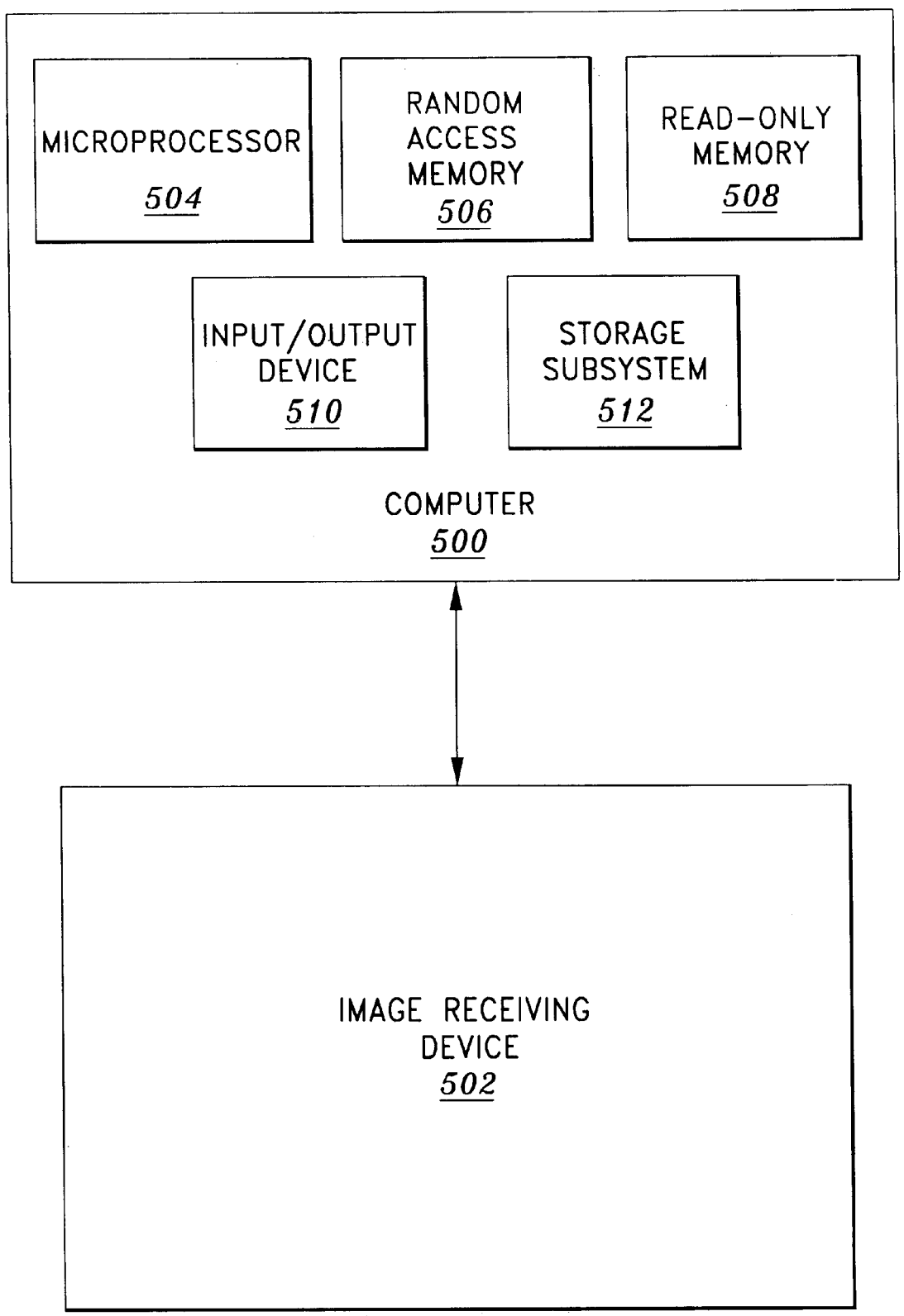
FIG. 5 is a block diagram of a computer system for processing captured images.

In a preferred embodiment, the image processing is performed by a computing device 500, which is attached to the image-receiving device 502, as illustrated in FIG. 5. The computing device 500 receives input from the image receiving device 502 via an input/output device 510. The computing device is controlled by a microprocessor 504, which may be a conventional microprocessor such as the Pentium® III by Intel Corporation, Santa Clara, Calif. The computing device 500 additionally may contain conventional random access memory (RAM) 506 for storing instructions and for providing fast access to relevant data, and conventional read-only memory (ROM) 508 for storing program code and other required data. A storage subsystem 512 may also be present for storing data and images received from the image-receiving device 502, and for subsequent processing of those images. The image-receiving device 502 may be attached directly to the computing device 500, as in the case of digital or video imaging devices. In other embodiments, however, the image receiving device 502 may be a film camera, and the film may be processed in a conventional manner, and the resulting film images supplied to the computing device 500, e.g., via a conventional scanner (not shown). The storage subsystem 512 may be either internal to the computing device 500, or else may be located externally.

The groups to be selected are identified by the processor 504, which then performs calculations based upon the data stored in RAM 506, ROM 508, or in the storage subsystem 512, that correspond to the identified pixels in the groups.

In a preferred embodiment, and as assumed for purposes of this description, the eye 102 remains substantially motionless between capture of the left and right images, and the camera or imaging devices 104 travels in a horizontal direction. In alternative embodiments, however, the camera 104 can move in a vertical or diagonal direction. In yet other alternative embodiments, the camera 104 can remain in a fixed position, and the eye 102 may move or rotate.

After selecting the pixel groups 306, 308, pixels in each group are measured by the computing device 500 to determine their intensity. In a preferred embodiment, the red, green and blue intensity levels for each pixel are each measured. In an alternative embodiment, other color channels may be used, for example cyan, yellow and magenta. In still other embodiments, intensity values may be calculated for each pixel as a function of grayscale values of color components.

Each pixel along a given line has an associated intensity. In a preferred embodiment, the intensity of each of the red, green and blue color components that are present in each pixel in a group is calculated, and the mean intensity value of each group and its variance are calculated for each of the three colors. Then each pixel in a group of the left image 302 is compared to the corresponding pixel in the same group of the right image 304.

Because either the camera 104 or the eye 102 or both have moved between images, the left-most pixels of the left image 302 may not represent the same part of the fundus 106 as the left-most pixels of the right image 304. Thus, any information that is already known, for example the distance the camera 104 has moved between images, can be used to improve accuracy. In addition, a conventional matching algorithm known by those skilled in the art and described, for example, in G. Xu and Z. Zhang, *Epipolar Geometry in Stereo, Motion and Object Recognition*, Kluwer Academic Publishers, Dordrecht, The Netherlands, 1996, pp. 221–245, which is incorporated by reference herein in its entirety, may be employed to identify corresponding pixels in each image 302, 304. In another embodiment, however, it may be assumed that the location of a group in the left image 302 will be the same as the location of the corresponding group in the right image 304.

The intensity of each individual pixel is then recalculated in either or both images to yield associated pixels of approximately equal intensity. For example, point 318a is a pixel in the left image 302, and point 318b is the corresponding pixel in the right image 304. After the images are arranged into groups, point 318a will be part of group 306a, and point 318b will be part of corresponding group 308a. As can be seen from the left 302 and right 304 images, the left point 318a is considerably darker in than the corresponding right image point 318b. Next, the mean intensity values and the variances for groups 306a and 308a are calculated.

For example, if $X_1$ and $X_2$ are discrete random variables with values $\{x_i^1\}$ and $\{x_i^2\}$, then the expected or mean values of $X_{1,2}$ are defined by $$EX_{1,2} = \mu_{1,2} = \sum_i x_i^{1,2} p(x_i^{1,2}), \tag{1}$$

where p is the probability function. The quantities $$EX_{1,2}^2 - \mu_{1,2}^2 = \sigma_{1,2}^2 \tag{2}$$

are the variances of $X_{1,2}$ or the expected values of the square of the deviations of $X_{1,2}$ from their expected values. Variables $X_{1,2}$ should be adjusted so that the expected values $\mu_{1,2}$ and variances $\sigma_{1,2}^2$ are the same for both variables. In the simplest case, a linear transformation may be used:

$$X_2 = aX_1 + b, \tag{3}$$

where a and b are constant parameters. Substitution of (3) into (1) and (2) gives:

$$b = \mu_2 - a\mu_1, \tag{4}$$

$$a = \sqrt{\frac{\sigma_2^2}{\sigma_1^2}}.$$

Assume the pixel brightness level in the pixel of point 318a is $X_1$ and in the pixel of point 318b is $X_2$. This provides the mechanism of image adjustment. Expected values and variances for both groups 306a and 308a can be calculated using a probability function such as p=1/H, where H is the number of pixels along the lines in the image. Those skilled in the art will appreciate that other probability functions could be used, such as exponential, normal, or functions derived from the data. In addition, higher order moments could also be used for more accurate adjustments.

The next step is to recalculate pixel brightness in one or both images using equation (3), for example. One image may be adjusted to the other, or both images may be adjusted to some values $\mu$ and $\sigma^2$. For example, average values such as $\mu=(\mu_1+\mu_2)/2$, exponential values $\sigma^2=(\sigma_1^2+\sigma_2^2)/2$, or so other desirable values could be used.

This adjustment is made for every separated color component, and the results may then be recombined in order to obtain adjusted color images. It is also possible to estimate the average disparity and to equalize the expected value and variance in the shifted groups, in order to obtain a more precise result.

FIGS. 4a and 4b depict the results of the adjustment where p=1/H, $\mu=(\mu_1+\mu_2)/2$, $\sigma^2=(\sigma_1^2+\sigma_2^2)/2$). FIG. 4a is the left image (corresponding to FIG. 2a) after the adjustment, and FIG. 4b is the right image corresponding to FIG. 2b) after the adjustment. As can be seen, whereas points 202a and 202b had different intensity levels, the same points 402a and 402b do not noticeably differ in their intensity after the adjustment.

Figure 7A:
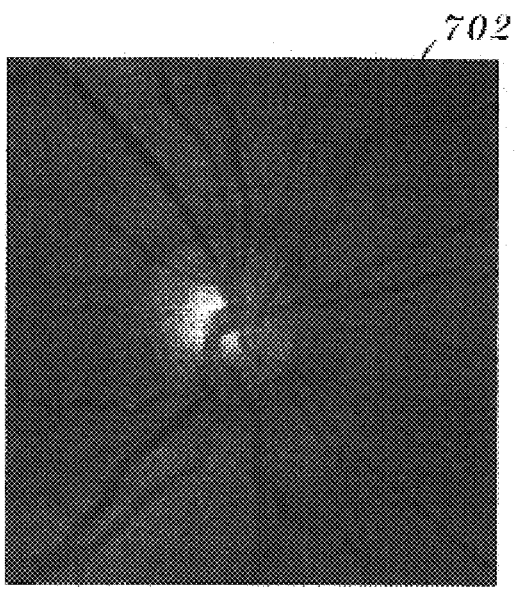
FIG. 7a is an anaglyph of an uncorrected image pair of an ocular nerve.
Figure 7B:
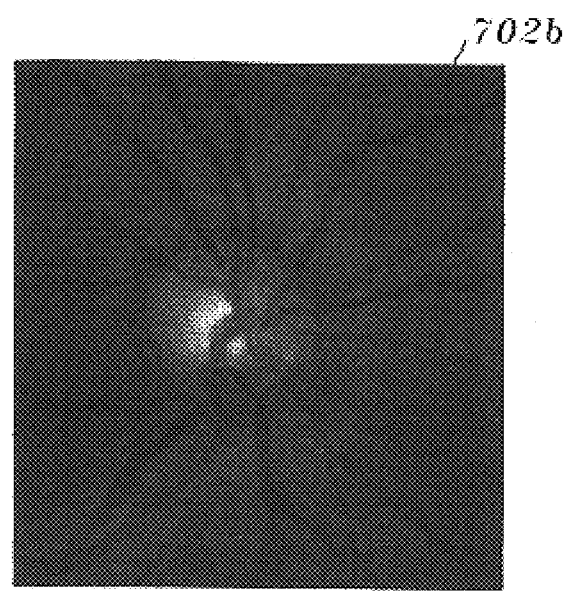
FIG. 7b is an anaglyph of an illumination-corrected image pair of an ocular nerve.

The results may also be seen by reference to FIGS. 7a and 7b. FIG. 7a is an anaglyph image of a fundus 106. The differences resulting from illumination errors are visible as a red tint toward the right hand side of the image, including point 702a. FIG. 7b is an anaglyph of the same fundus 106 after the adjustment has been made. Even without the use of colored filters to view the anaglyph, it can be seen that the red tint at point 702a is not present at the corresponding point 702b in the adjusted image of FIG. 7b, indicating that the illumination errors have been significantly reduced or eliminated.

Figure 8A:
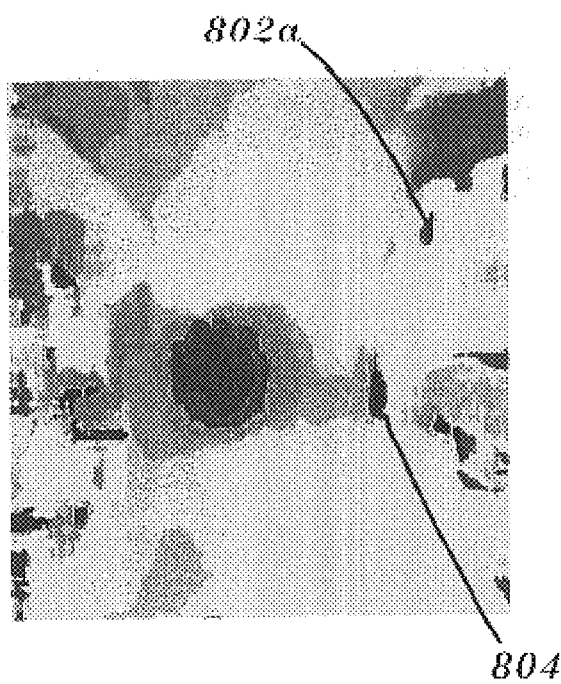
FIG. 8a is a disparity map of an uncorrected image pair of an ocular nerve.
Figure 8B:
FIG. 8b is a disparity map of an illumination-corrected image pair of an ocular nerve.

FIG. 8a is a disparity map of the images of FIG. 2, and FIG. 8b is a disparity map of the images of FIG. 4. In both FIGS. 8a and 8b, illumination errors are represented by abrupt changes in color, as at points 802a, 802b, and 804. Note that errors in the left parts of FIGS. 8a and 8b are related to camera distortions, or caused by other phenomenon such as vertical parallax, and must be corrected by other means, such as epipolar adjustment. After the adjustment has been made, the error at point 802a has been significantly reduced to point 802b, and the error at point 804 has been eliminated. As may be seen from the figures, other errors present in FIG. 8a have also been eliminated in FIG. 8b.

Figure 6:
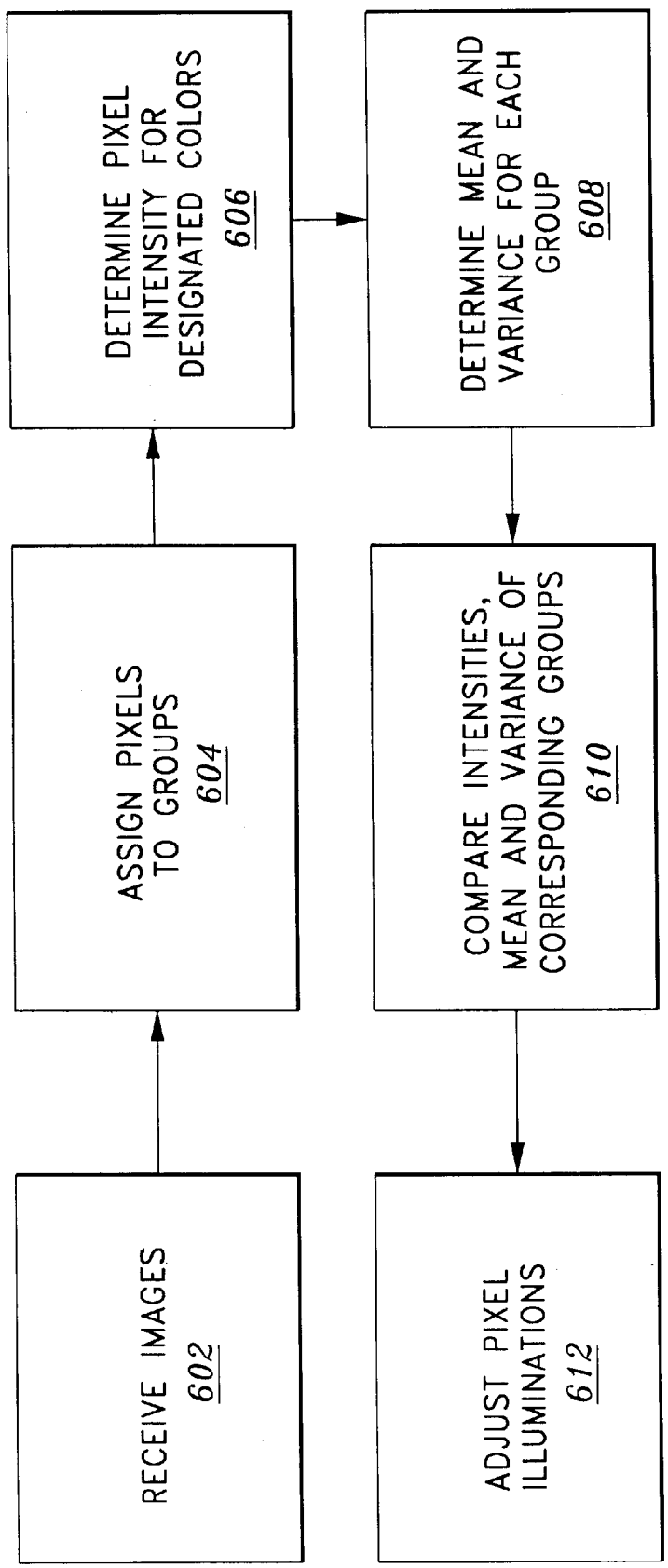
FIG. 6 is a flow chart illustrating the operation of an embodiment of the present invention.

Referring now to FIG. 6, there is shown a flow chart of the operation of one embodiment of the present invention. The computing device 500 receives 602 the images to be processed. The pixels are then grouped 604, e.g., into straight or longitudinal lines, and the pixel intensities for the designated groups are then determined 606. Next, a mean and variance for each group is determined 608, and the intensities, mean and variance of corresponding groups are compared 610. Finally, the pixel intensities are adjusted 612, resulting in the elimination of illumination errors between the two images. Additional details regarding each of these steps are described above. It will be understood by those skilled in the art that the order of steps described by FIG. 6 is merely one preferred embodiment of the present invention, and that the various steps may be performed in alternative steps. For example, the step of determining which groups correspond to each other in each image may be performed immediately after the groups are determined. In yet another embodiment, the intensities of the pixels may be adjusted only for one color instead of three. Still other changes to the execution order of the steps of the present invention will be readily apparent to those skilled in the art.

Fast Epipolar Line Adjustment

As noted, the present invention can be used in conjunction with any number of different image capture devices including video cameras, video capture devices on personal computers, standard photographic cameras, specialty stereo imaging cameras or digital cameras. The following sections of this description describe the invention as being used in conjunction with standard photographic cameras for illustration purposes.

Figure 9B:
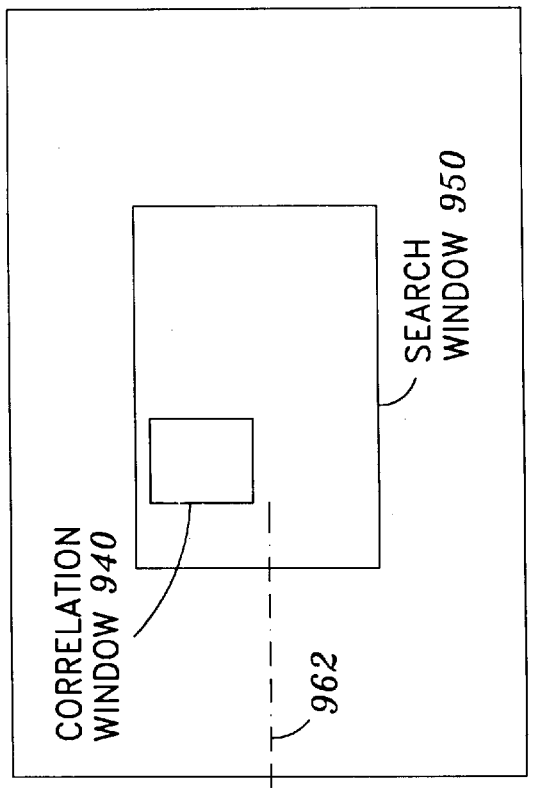
FIGS. 9a and 9b comprise two sample images that illustrate a preferred method for establishing match candidates among points in the images.
Figure 9A:
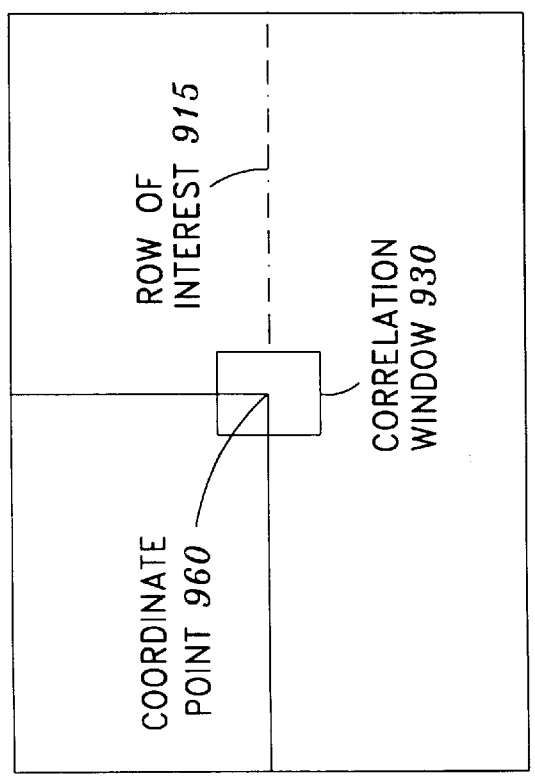

The standard still-frame camera is normally used to capture an image of a scene or object. When the picture is taken, however, the image of the scene is "flattened" from three dimensions to two dimensions resulting in the loss of information, such as spatial size and the spatial relations between objects in the image. One way of replacing the lost information is to take two or more images of the same object from different angles, called stereo images, and to extrapolate the spatial information accordingly. FIGS. 9a and 9b depict two sample images illustrating a preferred method for establishing match candidates among points in the images. In order to combine the images properly, portions of the first image 910 must be corresponded to the relevant portions in the second image 920.

It is often assumed that the stereo image correspondence problem is a one-dimensional search problem. This is true if the spatial relationships between the locations from which the images were taken, called the epipolar geometry, is known from the beginning. In the classical method, known as the calibrated route, both cameras (or viewpoints) are calibrated with respect to some world coordinate system. That information is then used to calculate the epipolar geometry by extracting the essential matrix of the system. The three-dimensional Euclidean structure of the imaged scene can then be computed.

If the two cameras are not carefully placed or are not absolutely similar to each other, however, recovery of the epipolar geometry is necessary, if it is desired to perform a more precise analysis. Recovery of the epipolar geometry is necessary whether the two images are taken with a moving camera or taken by a static camera in two locations. Thus, the system and method for recovering the epipolar geometry is useful in both contexts.

In the ideal case, the epipolar lines of the two images are horizontal. In order to guarantee horizontal epipolar lines, however, it is necessary to set the optical axes of the two cameras in parallel. For instance, calibration can be used to guarantee that the optical axes are parallel, the base line is horizontal, the sensors, which are used to create the image, coincide, and that the cameras have the same lens distortion. If any of these factors are incorrectly calibrated, however, the points in one image may not have matching points lying along the same row in the second image 920.

Matching points in one image 910 with points in another image 920 where both images are taken of a single scene, called the correspondence problem, remains one of the bottlenecks in computer vision and is important to continued development in this field. As will be more fully described below, the present invention adjusts the points in the second image 920 that correspond to the points in the first image 910, so that the points in the second image 920 are located along the same line as in the first image 910, thereby creating images with the desired epipolar geometry. As an initial matter, an understanding of a matching algorithm that is used in the preferred embodiment of the present invention is necessary. While this matching algorithm will be used to illustrate the preferred embodiment, those skilled in the art will realize that other matching algorithms may also be used to implement the present invention.

Referring now to FIGS. 9a and 9b, two sample images 910, 920 illustrating the technique for establishing match candidates are shown. For a given coordinate point 960 (i, j) in the first image 910, a correlation window 930 centered at the point 960 is created. Once the point 960 has been selected in the first image 910, a search window 950 is positioned around a point in the same, or similar, location in the second image 920. The size and position of the search window 950 may reflect some a priori knowledge about the disparities between the images 910, 920 if desired. If no such knowledge is available, the whole image 920 may be searched.

Once the search window 950 has been selected, a matching algorithm is performed. First, a correlation window 930 about the point 960 of interest in the first image 910 is created. The correlation window 930 may be of any size but a larger window 930 will yield less precise results than a smaller window 930. The values of one or more properties of the area within the correlation window 930 of the first image 910 are then calculated. For example, the matching algorithm may use the amount of red in the points within the correlation window 930 as the relevant correlation property.

An equally sized correlation window 940 is then centered on points within the search window 950 in the second image 920. The value of one or more correlation properties of areas within the correlation window 940 of the second image 920 are then calculated. Each point within the search window 950 in the second image 920 is given a correlation score based on its similarity to the properties of the correlation window 930 of the first image 910.

A constraint on the correlation score can then be applied in order to select the most consistent matches: for a given couple of points to be considered as a match candidate, the correlation score must be higher than a given threshold, for example. Using the correlation technique, a point in the first image 910 may be paired to several points in the second image 920 and vice versa. Several techniques exist for resolving the matching ambiguities but, for simplicity, the points with the highest correlation score will be selected. Although the described algorithm is the preferred technique for matching the points in the images, other matching algorithms may also be used including: correlation-based matching, MRF-based matching, feature-based matching and phase-based matching.

Figure 10A:
FIGS. 10a and 10b provide two images, each taken of the same scene from a different location, demonstrating the matching algorithm and the enhanced method of the present invention.
Figure 10B:

Referring now to FIGS. 10a and 10b, an image pair of a can and stapler, each taken from a different location, is shown. This image pair will be used to demonstrate application of the matching algorithm and the enhanced method 1300 of the present invention. As described above, the matching algorithm is performed in order to correspond a point in the first image 910 with a point in the second image 920.

Figure 11:
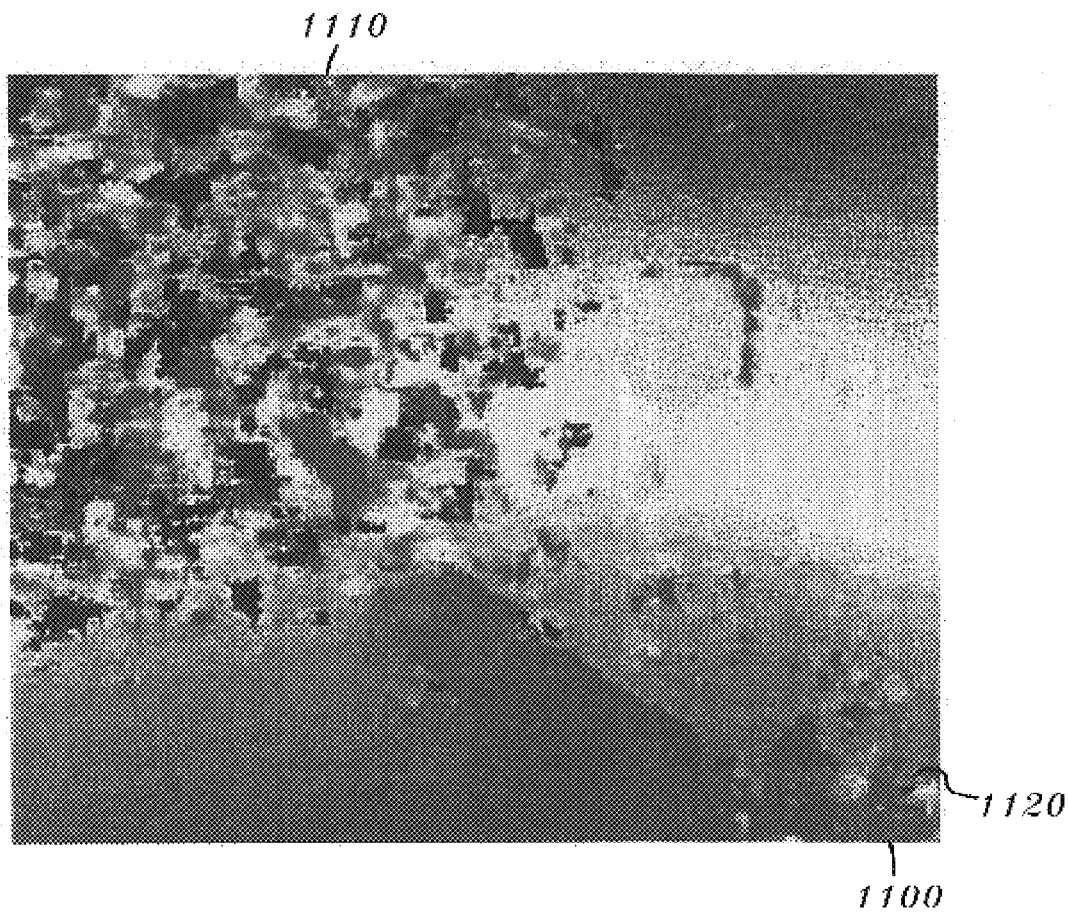
FIG. 11 is a red color disparity map generated from the can & stapler image pair shown in FIG. 10.

FIG. 11 is a red color disparity map generated from the application of the matching algorithm to the can and stapler image pair 1010, 1020 illustrated in FIG. 10. A disparity map 1100 is an image that graphically represents values assigned to a point or region in an indexed file, such as an image file. The disparity field values are the calculated distances between an image capture device and a location or object in that point of the image. Thus, every point in the image at some fixed distance away from the camera, such as 5 feet away, should be the same color in the disparity map.

The distances for this disparity map 1100 were calculated by using the correlation method described above with reference to FIGS. 9a and 9b. In this example, the correlation window 930 was a 10×10 point window and the search window 950 covered every point in the same row in the second image 920 as the point being matched in the first image 910. The amount that a point in the second image 920 needed to be shifted in order to align with the point 960 in the first image 910 was used to determine its relative distance from the camera using Euclidean geometry.

The ideal result of this process is a disparity map 1100 that has smooth transitions as the object in the image moves away from the camera. For example, the portion of the stapler that is away from the camera should be darker (assuming darker colors mean farther distance) than the portion of the stapler that is toward the camera. Any significant deviations, i.e., portions of the disparity map 1100 that have dark and light points all mixed together, represents miscalculations in the correlation method. As FIG. 11 illustrates, there is "noise" in the upper left 1110 and bottom right corners 1120 of the disparity map 1100. The noise 1110, 1120 is caused by image distortion and incorrectly selected epipolar lines.

Figure 12:
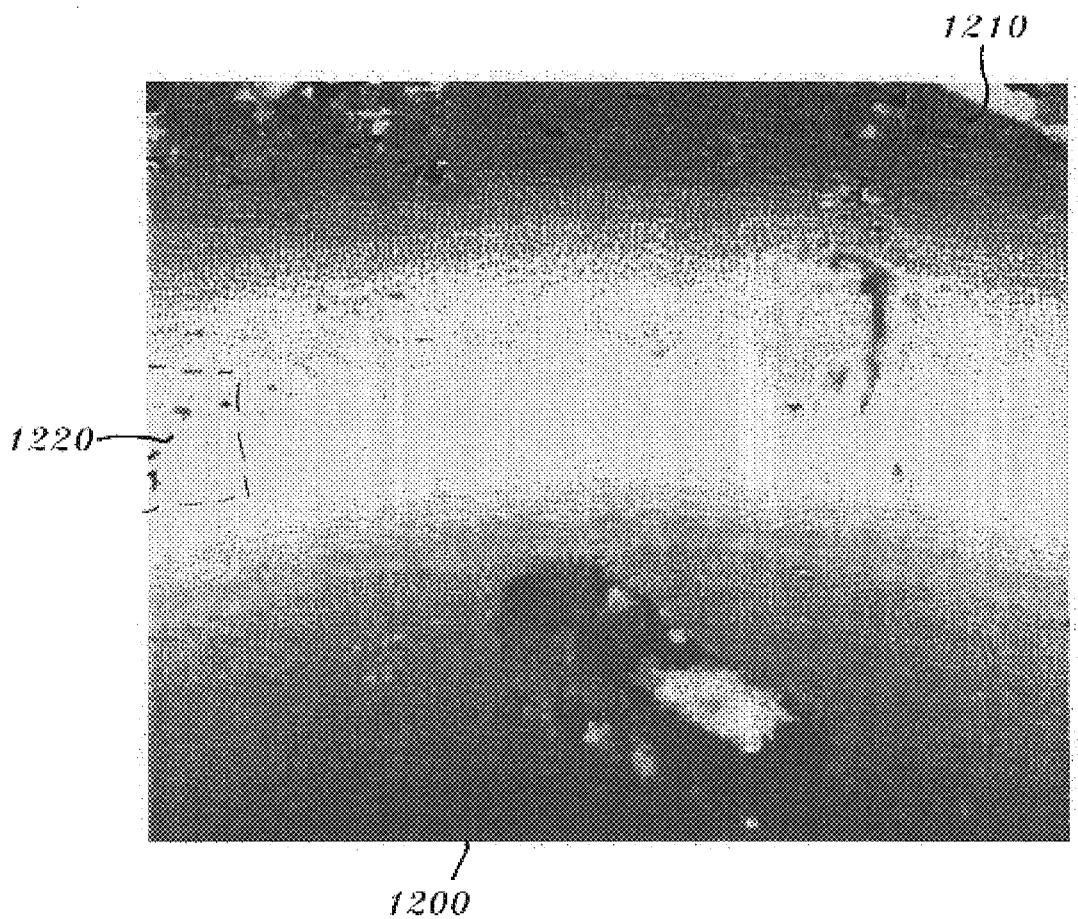
FIG. 12 illustrates improved red color disparity maps calculated by extending the search algorithm described in FIG. 10.

Referring now to FIG. 12, an improved red color disparity map 1210 was generated by using a broadened search window 950. More specifically, the selection of points that serve as the center of the search window 950 in the second image 920 was extended to 7 rows above and below the row 962 corresponding to the row of interest 915 in the first image 910. This extended search area attempts to take account for the fact that vertical and horizontal distortion may have placed the "matching" point in the second image 920 in a different row than the point 960 in the first image 910.

As illustrated, some of the noise 1210, 1220 in the corners disappeared and the result is better than the disparity map shown in FIG. 3. The reduced amount of noise 1210, 1220 in the color disparity maps 1200 indicates improved correlation between the images 910, 920.

There are two disadvantages to this algorithm without further enhancement: speed and linear distortion. The algorithm can be slow because every point in the search window 950 must be compared to the point 962 being matched. This is particularly true when a better correlation is desired as the normal method for improving correlation necessitates using larger and larger search windows 950. This can be time intensive as the algorithm must calculate a correlation value for a correlation window 940 around an increasingly larger set of points in the search window 950.

The unmodified application of this algorithm can also cause linear distortion in the resulting image. Linear distortion results from the fact that the algorithm described approximates the vertical shift with an integer number and there are often regions in the image where this approximation is incorrect. When an image is converted into digital format, each point in the digital image is assigned a particular color. It may be the case, however, that the coordinate point 960 in the first image 910 is actually represented by a combination of two points in the second image 920. For example, this would be the case if the second image 920 was captured by a camera that was improperly calibrated by three and a half points vertically upward. Since the algorithm compares the coordinate point 960 to a single point in the second image 920, the algorithm will choose either the point three points below the coordinate point 960 or will choose the point four points below the coordinate point 960 in spite of the fact that neither point is the correct match.

Figure 13:
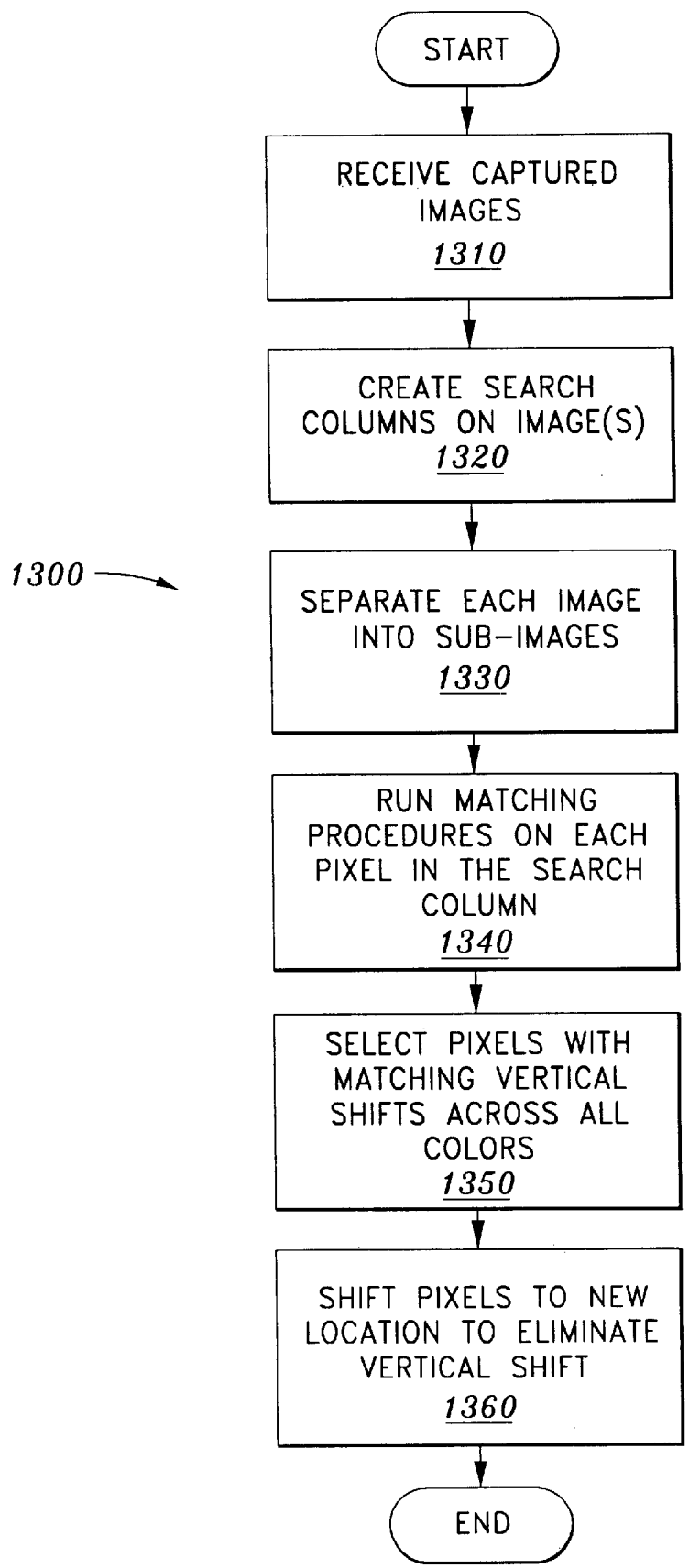
FIG. 13 is a flowchart illustrating the invented method for aligning images by adjusting epipolar lines using a search algorithm.

Referring now to FIG. 13, a flowchart illustrating the method 1300 for aligning images by adjusting epipolar lines according to one embodiment of the present invention is shown. The method comprises: creating 1320 two "search" columns on the first image 1310; separating 1330 each image 910, 920 into gray-scale "sub-images" by splitting up each color coordinate into individual gray-scale components; running 1340, 1370 a matching algorithm to identify matching points in the first and second sub-images; and using the matching points to adjust 1360, 1380 the points in the images 910, 920 so that the epipolar lines are parallel. Once these steps have been performed, the adjusted images can then be combined to form a single stereo image or used to assess spatial information about the object or scene captured in the image as desired.

In order to adjust the points with maximum accuracy while reducing the time required to correlate the points, the method can run the matching algorithm for each color only along a subset of the total number of points in the images 910, 920. Of course, with increased processing power, all points may be correlated in a timely manner. In the preferred embodiment, two vertical columns are created 1330 on the first image 910. Each vertical column comprises a column of one or more points that will be matched to a corresponding point in the other image 920. By creating these "matching columns," the matching algorithm can be run with greater accuracy while avoiding substantial processing times by limiting the range of points.

Preferably, these columns are located toward the edges of the image. For example, if the first image 910 captured the "left" side of the scene while the second image 920 captured the "right" side of the scene, then the column could be placed at right edge of the first image 910 as overlap is guaranteed. The second column must be placed more carefully to insure that the column overlaps with one or more matching points in the second image 920.

A variety of means can be used to guarantee overlap including a priori knowledge of the location of the capture devices or, if desired, the matching algorithm can be run on the first column and one or more horizontal shift calculations can be used to select a safe distance for the second column. For example, if the process is completed for the first column, the second column could be placed at twice the distance of the calculated horizontal shift.

Once the columns have been selected, the original images are separated 1330 into their component parts. This is accomplished by separating 1330 each image into gray scale "sub-images" using the value of each color coordinate as the corresponding gray-scale value. A standard format for points in a digital image is Red-Green-Blue (RGB) color coordinates that specify the amount of red, green and blue of the respective point. In this example, three subimages, one for red, blue, and green, respectively, are created. For example, if a point in an image has the color coordinate (100, 150, 200), then that point will have a gray scale value of 100 in the "red" sub-image, 150 in the "green" sub-image and 200 in the "blue" sub-image. These "sub-images" are generated from both images, resulting in a total of three sub-image pairs.

A matching algorithm is then run 1340 on each of the sub-image pairs. The points in the search column in the "green" subimage of the first image 910 are compared to the points in a similar area in the green sub-image of the second image 920 using a matching algorithm. In the preferred embodiment, the matching algorithm described with reference to FIG. 10 may be used. Alternatively, any number of different matching algorithms may be used to match points. This process is repeated for both the red and blue sub-images. If the points of the original image are RGB triplets, a total of three searches, one for each color coordinate, are performed for each point in the search column. Other types of color coordinates may also be used, however, so the number of searches performed will vary with the number of color coordinates. This process is repeated for the points in the second search column of the first image 910.

The search results in six sets of point pairs—the points in both search columns of the first image 910 paired with the matching points in the second image 920 for each coordinate sub-image. Each point pair has a vertical shift and a horizontal shift that is defined as the difference between the location of the point being matched in the first image 910 and the matching point in the second image 920. All of the point pairs having the same vertical shift across each of the sub-images are selected 1350. For example, if the search of the "green" gray-scale sub-image matches point 1 to a point with a vertical shift of three, and matches point 2 with a point having a vertical shift of five; while the search of the "red" gray-scale sub-matches the same point 1 and point 2 with points having vertical shifts of seven and five respectively; then only point 2 is selected, as both searches located matching points with a vertical shift of five for the same point. Different vertical shift values may be calculated for points in the right and left search columns.

Ideally, an identical match of several points in each search column will be found. Because of the rigorous selection process, only picking points that match each color coordinate individually and have a vertical shift identical to the other point pairs, it is very likely that points selected are accurate match points. It is possible to apply some additional filtering algorithm to the result, such as median filtering, for example, but that is not required to practice the present invention. Using a filtering algorithm may be particularly useful, however, if a priori information about possible distortions is available.

If maximum accuracy is desired, this process may be repeated to locate matching points in both directions. Thus, points in the search columns in the first image 910 are matched to points in the second image 920 and points in the search columns of the second image 920 are matched with points in the first image 910. In this case, the point pairs generated in the additional search should have the same magnitude vertical shift as the first set of point pairs except that the shift will be in the opposite direction. This additional step can provide a further guarantee that the correct vertical displacement was selected. In the event that the vertical shifts are not identical, a mid point between the vertical shifts can be used to align the images 910, 920. The points in the columns containing the matching points are then adjusted 1360 by the calculated vertical shift so that the matching points in both images are vertically aligned.

The next step 1360 is to approximate the resulting shift of the areas between the matching columns and areas to the left and right of the matching columns. In the preferred embodiment, the approximations are performed using a mathematical function. In the simplest case, the function is linear, so the vertical shift for each column between the matching columns are calculated by extrapolating a new value using the vertical shift of the left matching column and the vertical shift of the right matching column.

In the case of vertical alignment, there will often be shifts that are not an integer value. In these cases, a new color value for the point is calculated by the linear interpolation of the values of the nearest points. For example, if the calculated shift is minus 3.5 points, then the average value of two consecutive points is placed in the location 3 points below the lower of the two points. In this example, the new value could be an average of the color coordinates of the two points. New values are calculated for each color coordinate point and these values substitute the values at the given point.

While this method 1300 has been described using linear equations to correct for linear distortion, this method 1300 can also correct nonlinear distortion. One or more additional columns, placed anywhere in the images, may be used in this procedure. For example, if lens distortion tends to be more pronounced in the center of the image, 3 additional columns can be placed close to the center of the image, resulting in more precise approximation in that region of the image. Additionally, non-linear equations may be used to approximate shift across the image. Finally, different equations may be used to approximate the shift of different parts of the image. For example, the approximation could be linear for the middle and non-linear for the outer portions. In this way, it is possible to correct lens distortion, which is not linear, and still keep the algorithm working fast.

Figure 14:
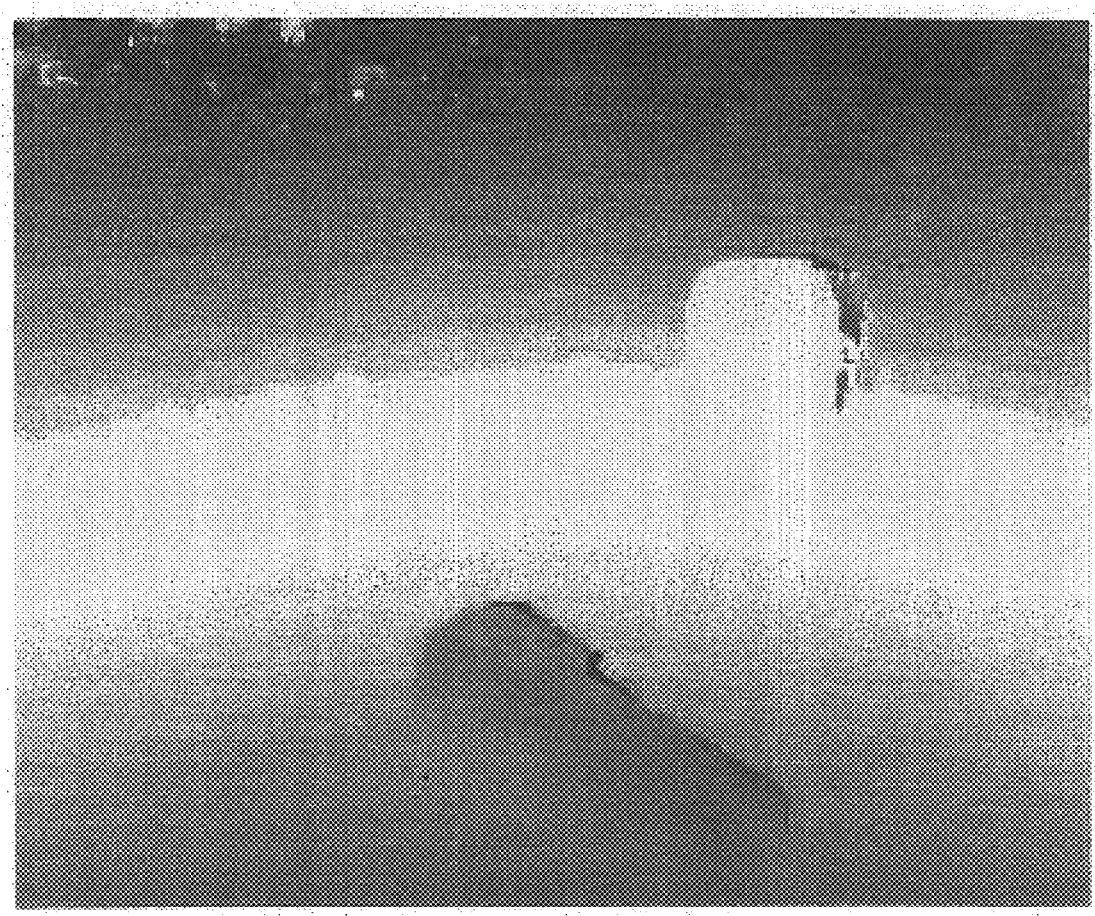
FIG. 14 provides a disparity map illustrating the improved results of applying the method of the present invention to the can and stapler image pair.

FIG. 14 illustrates the results of applying the method of the present invention to the "Can and Stapler" stereo pair. The calculated disparity field no longer has the errors in the central part of the image, in contrast to FIGS. 11 and 12. Additionally, the processing time of the method 1300 was substantially quicker than direct application of the algorithm. Another advantage of the method is simultaneous correction of all three colors, while in the classical correlation technique we have to apply a time consuming algorithm for every color. The larger the image, the greater time saving and the better correction, because the larger image will have more detailed boundary shift approximations.

Figure 15:
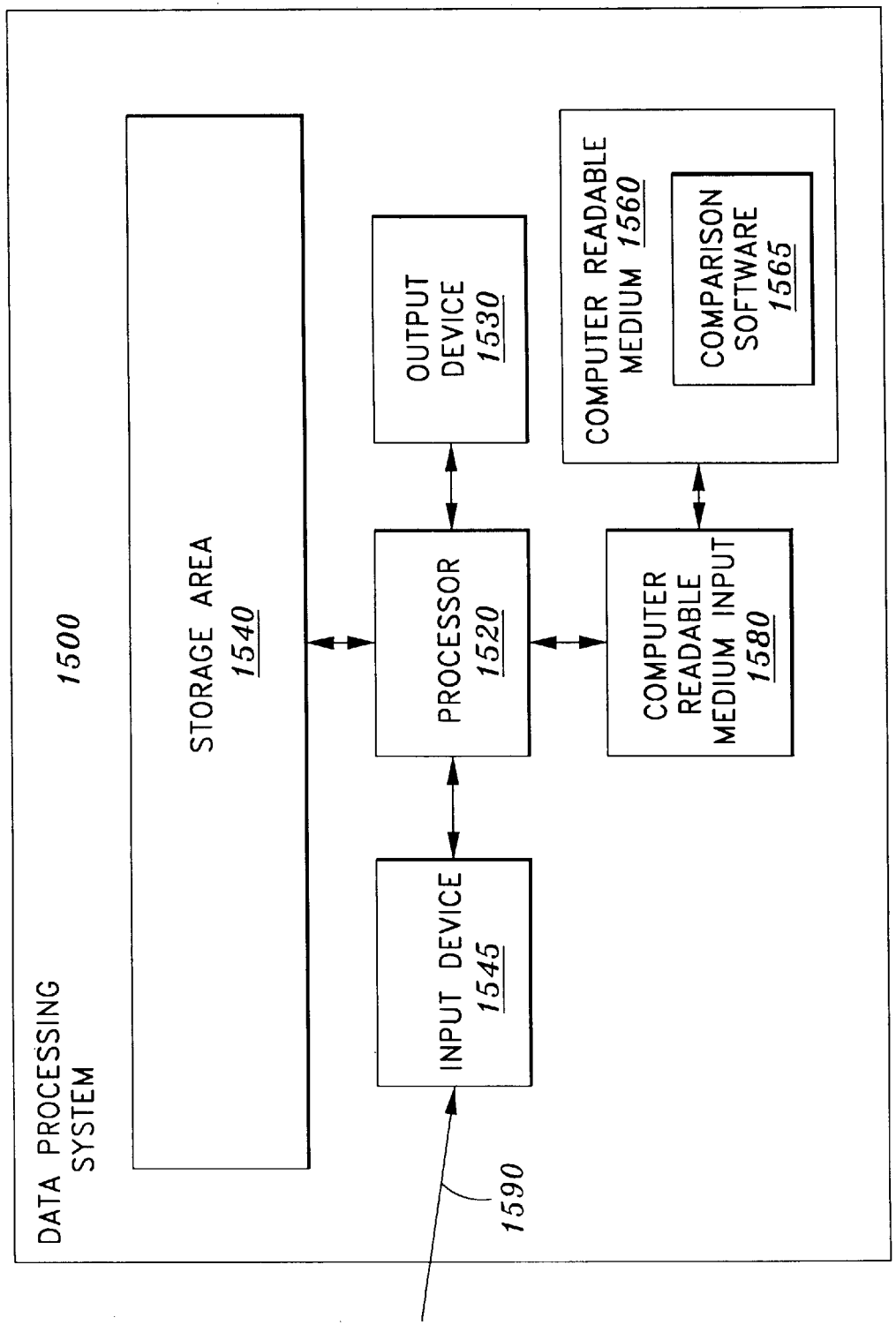
FIG. 15 is a block diagram of a data processing system that may be used to implement the invention.

FIG. 15 is a block diagram of a data processing system 1500, which has at least one processor 1520 and storage 1540. Storage 1540 of system 1500 includes one or more images, computer readable medium 1560, analysis software 1565 and data structures used by the matching algorithm. The steps of the described embodiment of the present invention are performed when instructions of a computer program are performed by processor 1520 (or another appropriate processor) executing instructions in storage 1540.

System 1500 also includes a network connection 1590, which connects system 1500 to a network such as the Internet, an intranet, a LAN, a WAN. System 1500 also includes an input device 1545, such as a keyboard, touch-screen, mouse, or the like. System 1500 also includes an output device 1530 such as a printer, display screen, or the like. System 1500 also includes a computer readable medium input device 1580 and a computer readable medium 1560. Computer readable medium 1560 can be any appropriate medium that has instructions such as those of analysis software 1565 stored thereon. These interactions are loaded from computer readable medium 1560 into storage area 1540. Instructions can also be loaded into storage area 1540 in the form of a carrier wave over network connection 1590. Thus, the instructions and data in storage 1540 can be loaded into storage via an input device 1580, via a network, such as the internet, a LAN, or a WAN, or can be loaded from a computer readable medium such as a floppy disk, CD ROM, or other appropriate computer readable medium. The instructions can also be downloaded in the form of a carrier wave over a network connection.

System 1500 also includes an operating system (not shown). A person of ordinary skill in the art will understand that the storage/memory also contains additional information, such as application programs, operating systems, data, etc., which are not shown in the figure for the sake of clarity. It also will be understood that data processing system 1500 (or any other data processing system described herein) can also include numerous elements not shown, such as additional data, software, and/or information in memory, disk drives, keyboards, display devices, network connections, additional memory, additional CPUS, LANS, input/output lines, etc.

Occlusion Errors

After the epipolar adjustment has been made, the next step in the matching process is the detection and removal of occlusion errors.

Unfortunately, the classical correlation technique discussed earlier gives greater disparity values in areas close to the object boundaries, making boundary areas difficult to analyze. This is particularly true when using a smaller correlation window, as the colors in the window change dramatically when the border of the object is included in the search. Using larger correlation windows results in less precise results, however, meaning that all points in the image, not just object boundaries, may be improperly matched.

Referring now to FIGS. 10A and 10B, a pair of images taken of a scene (hereinafter referred to as the "stereo pair") including a can and stapler, is shown. This stereo pair 10A, 10B will be used throughout this description to illustrate the invention. This illustration is not meant to limit the scope of the invention. Any number of images may be used, and the number or size of the objects in the scene are inconsequential to the operation of the system and method. For example, occlusion detection could be essential to discovery of neovascularization pathologies in the eye fundus.

Figure 16:
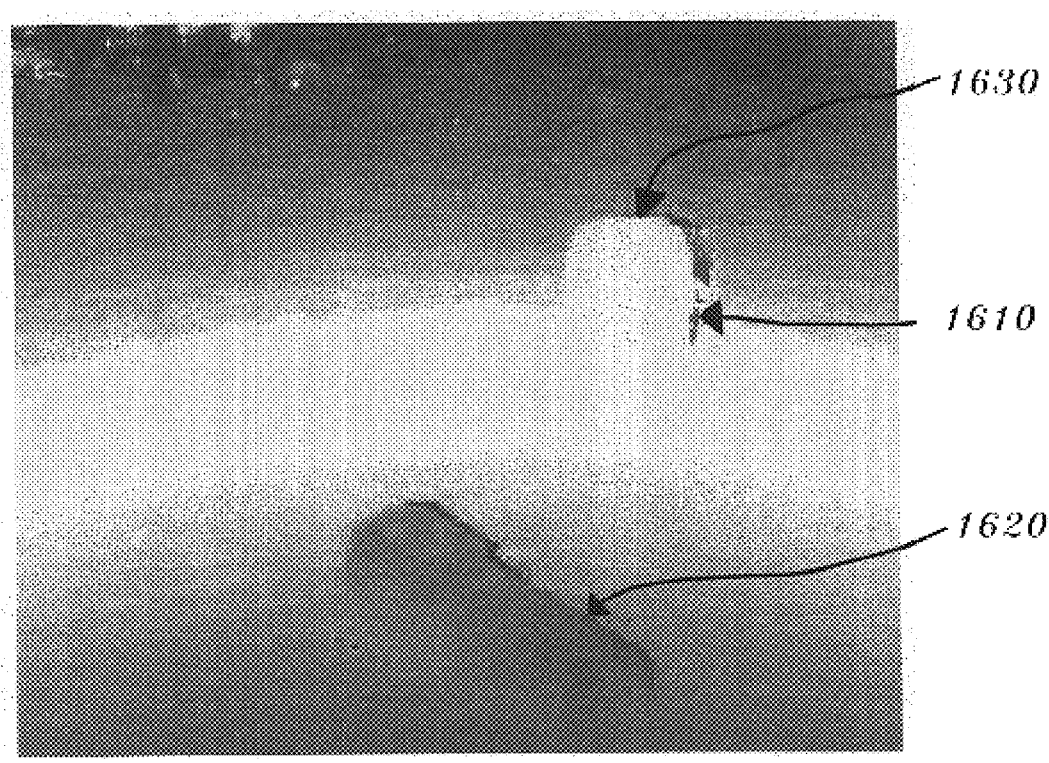
FIG. 16 is a disparity map of the scene that was created by combining FIGS. 10A and 10B using classical stereo matching algorithms.

Referring now to FIG. 16, a green color disparity map is shown. A green color disparity map is generated by examining only the green color in two images of a scene, using the resulting "green values" to establish a correspondence between the images, and using Euclidean geometry to determine the relative distance between a point in the scene and the location of the image capture device, such as a digital camera, used to capture the scene. In this example, the green disparity map was generated using the stereo pair from FIGS. 10A and 10B. Two other disparity maps, red and blue, (not shown) were also obtained from the images. Each of the disparity maps has the same features: occlusion errors 1610 to the right of the objects and out-of-focus errors 1620. These errors are generated by the traditional correspondence algorithms. This is caused by the fact that when matching points in the left image with points in the right image, the contours of the objects "leak" to the left of the object boundary. On the other hand, when matching points in the right image with one or more points in the left image, the contours of the objects "leak" to the right of the object boundary. The present invention uses these facts advantageously to prevent the leakage.

Figure 17:
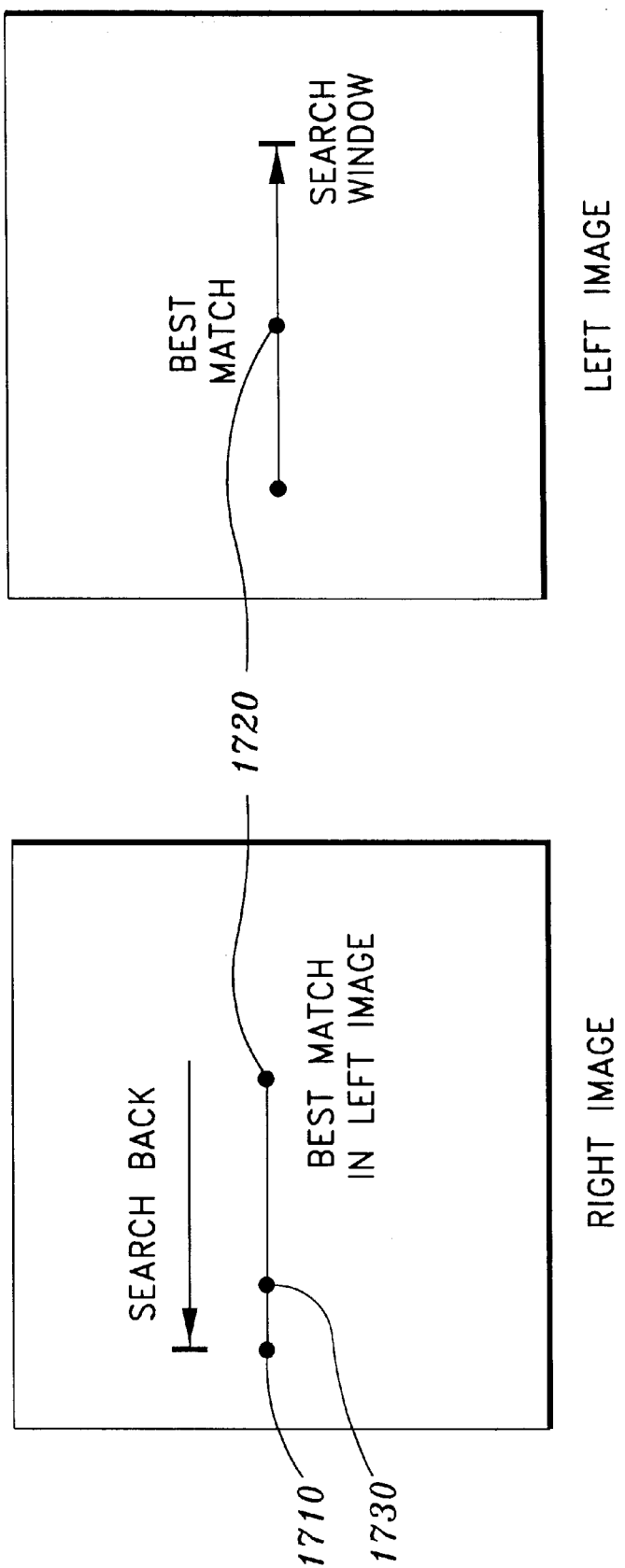
FIG. 17 is a block diagram that illustrates the stereo matching method of the present invention.

Referring now to FIG. 17, a diagram illustrating the operation of the method of the present invention is shown. The method starts by running the classical stereo correlation search described above. The correlation search uses a point 1710 in the right image and searches for a best match in the left image. Once a best match point 1720 is obtained in the left image, coordinates of this point 1720 is used as the basis for a second search that attempts to locate a best match for that point in the right image. In order to prevent leakage and to speed up the matching process, however, the correspondence algorithm does not attempt to match any points that are to the left of the original point 1710 in the right image. This search may result in a second best match point 1730 that is not equivalent to the original point 1710. This process results in two point pairs for every point in the right image:

a first pair of points 1710, 1720 that represents the best match between the original point 1710 in the right image with a matching point 1720 in the left image, hereinafter referred to as the "left pair"; and a second pair of points 1720, 1730 that represents the match between the matching point 1720 located in the left image with a point 1730 in the right image, hereinafter referred to as the "right pair."

In a first embodiment of the present invention, each of the resulting right pairs 1720, 1730 is used to establish a correspondence between the left and right image. The resulting correspondence between the images may then be used to create a stereo image or a disparity map.

This method was applied to the stereo pair 10A, 10B and used to correspond points in the images. The resulting red, green and blue color disparity map that were generated using the right pair 1720, 1730 of matching points are provided in FIGS. 18A, 18B, and 18C, respectively. While there are still errors in the correspondence (signified by the black patches in the images), the image boundaries 1810, 1820, 1830 are sharper and can be determined with greater accuracy than is possible for corresponding points 1610, 1620 and 1630 in FIG. 16.

In sum, this method combines the best features of both searches. The left pair 1710, 1720 gives the incorrect results for the right boundary of the object search, resulting in a value that is greater than the true value. When we search back in the right image, however, the right pair 1720, 1730 picks the correct smaller disparity value, resulting in a proper match at the right boundary. On the other hand, the left pair 1710, 1720 gives the correct results for the left boundary of the object. Although using the right pair 1720, 1730 would normally result in greater disparity and improper correspondence, the second search is limited by the true smaller value from the first search, and therefore effectively uses the correct results as established by the left pair. Thus, the results of the second search pick the best point pairs at both boundaries.

Figure 19A:
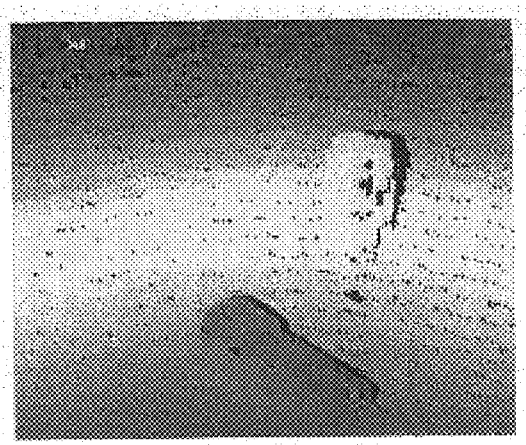
FIGS. 19A, 19B and 19C are individual color disparity maps that were generated using the second embodiment of the stereo matching method of the present invention.
Figure 19B:
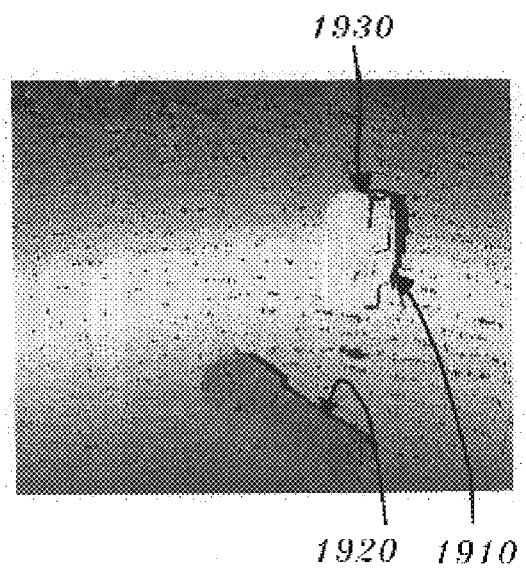
Figure 19C:
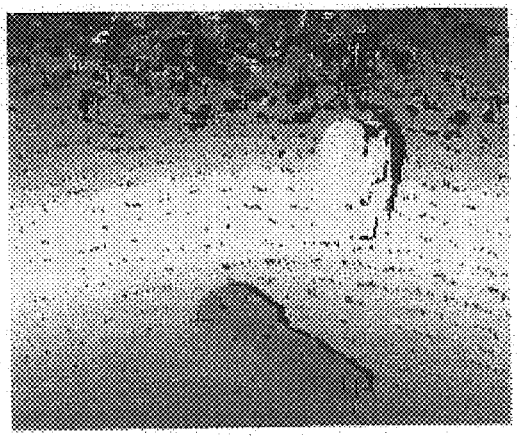

Additional embodiments of this invention can provide even better results. In a second embodiment, an additional step may be added to the first embodiment in order to help locate and remove errors in the correspondence. In this embodiment, if the search in the right image locates a different match point 1730 than the original point 1710, both points are considered erroneous and are replaced with a black point. Therefore, only the disparity values generated from both searches are considered accurate. As illustrated by the black portions in FIGS. 19A, 19B, and 19C, this embodiment results in fewer correct point values but provides more certainty for those values that it does correctly identify. FIG. 19B does contain numerous errors at the boundary 1920, but errors can be modified or corrected. As explained with respect to FIG. 10 above, the classical correlation technique gives greater disparity in areas close to the object boundaries, making boundary areas difficult to analyze. Thus, unmodified application of the stereo correspondence process results in incorrectly matched points meaning that the user or process does not know that it needs to correct the errors. Knowledge of potentially erroneous areas, however, is a significant advantage in many vision applications where the erroneous areas can simply be avoided as potentially representing an object boundary. This method helps to resolve that problem. In other words, the second embodiment is the preferred method for the elimination of false targets. The values generated by the second embodiment can also be filtered or used in combination with the results of the first embodiment to improve the results.

One benefit of this second embodiment is that it provides greater confidence in the accuracy of the points in the image. This can be of particular use in those applications where potentially unknown areas can simply be avoided. In machine vision applications such as robotics, for example, a moving robot can simply avoid black areas as potentially corresponding to an object that may prevent movement. This may lead to a more circuitous route, but is a better calculated choice when potentially expensive equipment is involved.

The results of the second embodiment could also be used in combination with the first embodiment to create a disparity confidence map. For example, the brightness of a particular pixel in the disparity map can be adjusted based on the second algorithm. All points in image 18A that correspond to potential erroneous points in image 19A could have a lower brightness value while "correct" points have a higher brightness value. Other applications and embodiments could also be developed using this error detection step.

Figure 18A:
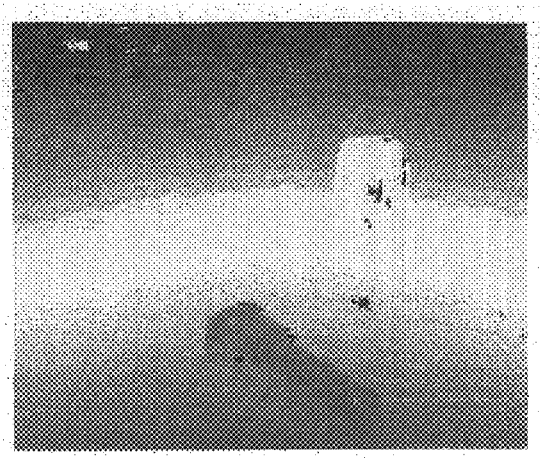
FIGS. 18A, 18B and 18C are individual color disparity maps that were generated using the first embodiment of the stereo matching method of the present invention.
Figure 18B:
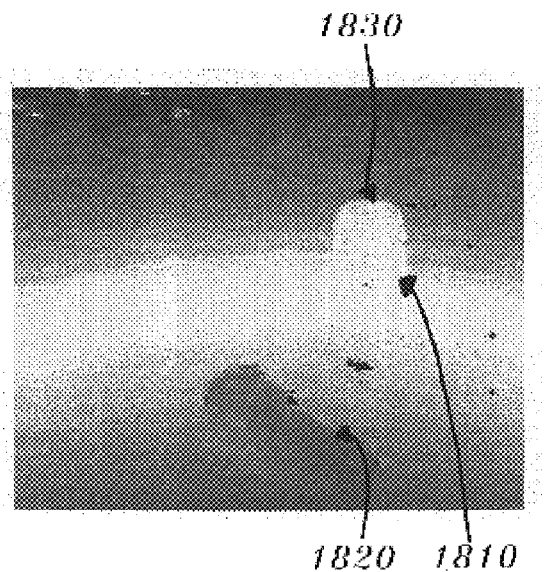
Figure 18C:
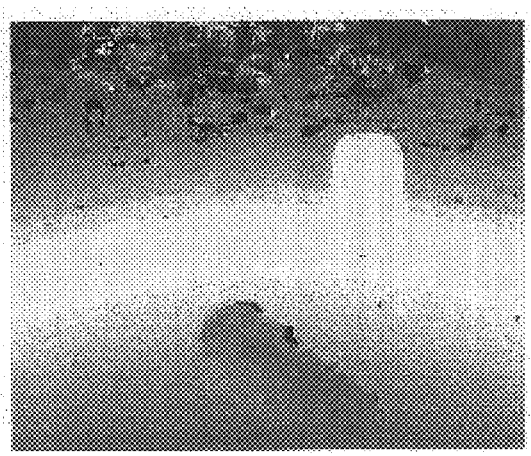

A third embodiment that includes additional error correction steps is also provided. As illustrated in FIGS. 18A, 18B, and 18C, each image may be split into a separate disparity map corresponding to each color coordinate. In this case, the images 18A, 18B, 18C represent the Red, Green, Blue components disparity maps, respectively. While these color components are standard image components, other color coordinate systems may also be used. Regardless of the type of color coordinates used, the first step is to compare each point in the disparity maps that corresponds to each of the colors. Next, every point that has a value that matches the value of a point at that same location in at least one of the other disparity maps is selected. Any point value that is represented by only one color at a particular location is eliminated from the map. Points in the disparity maps which have different values across every color are flagged.

Once all erroneous areas have been identified, the errors may be eliminated using a simple filter or interpolation techniques. One alternative for eliminating erroneous points in disparity maps created using the first embodiment is to replace the erroneous value with the first accurate value to the right of the error point. In this alternative, the true value is selected from the right of the error point because it is common for the contour to leak to the right of the occlusion boundary.

Figure 20A:
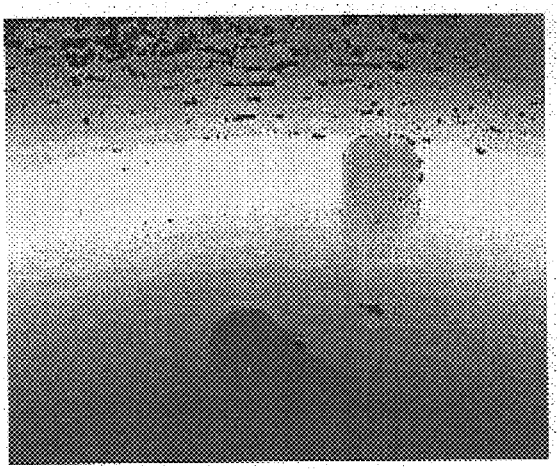
FIG. 20A is a disparity map created by combining FIGS. 18A, 18B and 18C into a single image.
Figure 20B:
FIG. 20B is the disparity map of 19A that has been further improved by applying the additional error correction steps provided by the present invention.

Referring now to FIG. 20A, a combined disparity map created using the first embodiment of the present invention is shown. This map 20A was generated by combining FIGS. 18A, 18B and 18C without further modification. The results of applying the additional error elimination steps on the disparity map 20A, i.e., replacing erroneous entries with a the first true value to the right of that point, are shown in FIG. 20B. As FIG. 20B demonstrates, the additional error filtering steps help create a vastly superior image resulting in an extremely accurate depiction of the can and stapler scene. The small remaining errors in FIG. 20B can be eliminated by applying well-known filtering or feature analysis algorithms.

Figures 21A, 21B:
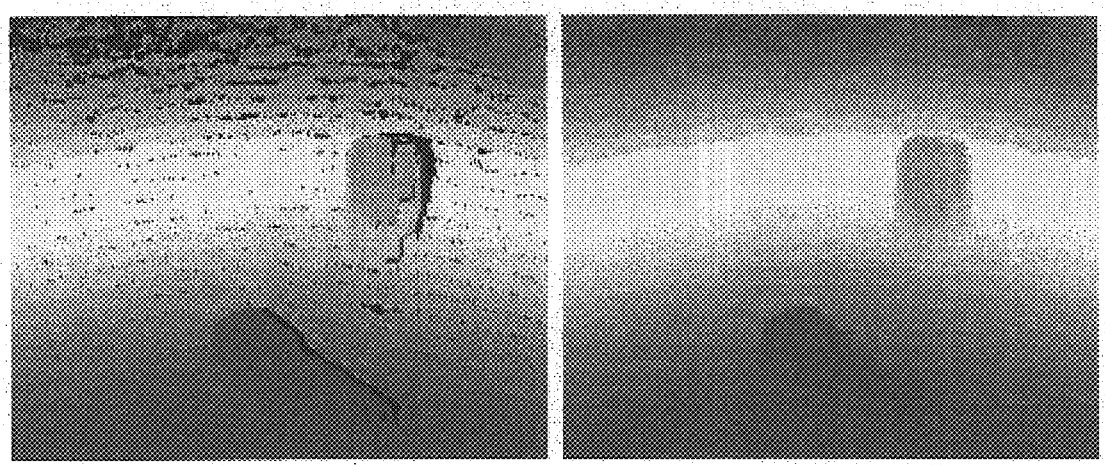
FIG. 21A is a disparity map created by combining FIGS. 19A, 19B and 19C into a single image.
FIG. 21B is the disparity map of 21A that has been further improved by applying the additional error correction steps provided by the present invention.

Referring now to FIG. 21A, a combined disparity map generated using the second embodiment of the invention is shown. This map was generated by combining FIGS. 19A, 19B, and 19C without further modification. The results of applying the additional error elimination steps on the disparity map 21A, i.e., replacing erroneous entries with the first true value to the right of that point, is shown in FIG. 21B. As FIG. 21B further demonstrates, the additional steps help create a vastly superior image resulting in an extremely accurate depiction of the can and stapler scene. Additionally, despite the greater number of error points in FIG. 21A, the final result looks better than in FIG. 20B because false targets were detected more precisely during the correspondence search. In an additional embodiment, a combination of the first, second and third embodiments above could be used to create a disparity map.

The additional error elimination steps are good for correcting both correspondence problems resulting from occlusions and out-of-focus errors. In areas that are out of focus, it is difficult to calculate exact disparity because there are no exact boundaries and the objects are blurred. In these cases, using either the first true value to the right of the error or interpolating a value using correct points to the left and right of the error point can result in significant improvement. The proposed algorithm can also be used with multiple cameras. It will probably reduce the number of cameras that are necessary for successful occlusion detection.

Referring now to FIG. 22, there is shown a flow chart of the operation of the first embodiment of the present invention's method of occlusion detection. First, the overlapping area between images is determined 2202. Then a first point 1710 is selected 2204 in the first image, and the correspondence search is run 2206 to find the matching point 1720 in the second image. A second correspondence search is then run 2208, using the matching point 1720 as the basis. This correspondence search 2208 searches for a corresponding second matching point 1730. However, since the search 2208 algorithm only searches from the beginning of the search row until the coordinates of the first match point 1710, the results of the second correspondence search 2208 may result in a point 1730 that is not at the same coordinates as point 1710. Finally, a final matching pair 1720, 1730 is selected 2210.

Although the description above contains many detailed descriptions, these descriptions should not be construed as limiting the scope of the invention but merely as providing illustrations of some of the presently preferred implementations of this invention. For example, although this method was described with reference to standard rectangular images, this method can be used to correct images of any shape or size. Additionally, although the method was described with reference to a particular correspondence method, other correspondence methods could be applied including correlation-based matching, MRF-based matching, feature-based matching and phase-based matching. In addition, where certain a priori information is known, various adjustments may not be required—for example, where it is known that camera positions 104a and 104b have been precisely aligned, the step of performing 2304 the epipolar line adjustment may be skipped. Thus the scope of the invention should be determined by the appended claims and their legal equivalents, rather than by examples given.

From the above description, it will be apparent that the invention disclosed herein provides a novel and advantageous system and method of accurately recovering the tomography of an eye fundus from 2D stereo images of the fundus.

What is claimed is:

1. A method for evaluating stereo images of an eye fundus, comprising the steps of:
   obtaining at least two images;
   correcting illumination errors in the images;
   adjusting epipolar lines associated with the images such that the images are vertically aligned;
   removing image occlusion errors in the images; and
   performing a matching analysis on the images;
   wherein the images are a first original image and a second original image and have at least some overlap area, and the step of adjusting epipolar lines comprises the substeps of:
      creating a left and a right search column on at least one of the original images, such that at least one of the columns includes at least part of the overlap area;
      creating two sets of gray-scale sub-images, one set of sub-images for each of the two original images;
      pairing the sub-images generated from the first original image with sub-images from the second original image such that a sub-image pair shares the same assigned color coordinate;
      running a matching algorithm on each point in the right and left search column of each sub-image pair;
      calculating vertical shift between points identified as matching by the matching algorithm;
      selecting points with identical vertical shift values; and
      aligning the points that were not selected in the image by extrapolating the resulting calculated vertical shift values for each column.

2. A method for evaluating stereo images of an eye fundus, comprising the steps of:
   obtaining at least two images;
   correcting illumination errors in the images;
   adjusting epipolar lines associated with the images such that the images are vertically aligned;
   removing image occlusion errors in the images; and
   performing a matching analysis on the images;
   wherein the images are a left image and a right image such that the images have at least some overlap area, and the step of removing image occlusion errors in the images comprises the substeps of:
      selecting a first point within the overlap area in the right image;
      running a first correspondence search using the first point to find a first matching point in the left image;
      running a second correspondence search on the first matching point to find a second matching point in the right image, wherein the correspondence search is not run on any points to the left of the first matching point; and
      selecting a match point comprising the first matching point and second matching point.

3. The method of claim 1, wherein the step of creating search columns further comprises the steps of:
   creating one search column in a middle row of the first image;
   running the matching algorithm on at least one point within the search column such that the points are matched with at least one point in the second image;
   calculating an average horizontal shift for the matched points;
   responsive to a calculated horizontal shift value that matches points in the middle row of the first image with points to the left of the middle row of the second image, creating two search columns on the first image such that the left column is shifted by at least the calculated horizontal shift value from the edge of the first image and the right column is created to the right of the first column; and
   responsive to a calculated horizontal shift value that matches points in the middle row of the first image with points to the right of the middle row in the second image, creating two search columns on the first image such that the right column is shifted by at least the calculated horizontal shift value from the right edge of the first image and the left column is created anywere to the left of the right column.

4. The method of claim 1, wherein running the matching algorithm comprises running a correlation-based matching algorithm.

5. The method of claim 1, wherein running the matching algorithm comprises running a feature-based matching algorithm.

6. The method of claim 1, wherein running the matching algorithm comprises running a phase-based matching algorithm.

7. The method of claim 1, wherein the step of aligning the remaining points comprises using an equation to calculate the shift values.

8. The method of claim 1, wherein the step of aligning the remaining points further comprises the steps of:
calculating a linear equation of the from mx+b, where m is equal to the difference between the shift values calculated for the left and right search columns divided by the number of points between the right and left search column and where b is equal to the calculated shift for the left column;
calculating a shift value for each column of the image using the calculated linear equation by replacing x with the number of columns between the left column and the column being shifted, such that columns to the left of the left column are assigned a negative x value;
shifting the points corresponding to that column by the value generated by the linear equation.

9. The method of claim 2, wherein the step of selecting a match point comprises selecting only those match points in which the second matching point is the same as the first matching point.

10. The method of claim 2, wherein the step of running a first correspondence search comprises running a classic stereo correspondence search.

11. The method of claim 2, wherein the step of running a first correspondence search comprises running a correlation-based matching algorithm.

12. The method of claim 2, wherein the step of running a first correspondence search comprises running a feature-based matching algorithm.

13. The method of claim 2, wherein the step of running a first correspondence search comprises running a phase-based matching algorithm.

14. A system for evaluating stereo images of an eye fundus, comprising:
means for obtaining at least two images;
coupled to the means for obtaining at least two images, means for correcting illumination errors in the images;
coupled to the means for correcting illumination errors in the images, means for adjusting epipolar lines associated with the images such that the images are vertically aligned;
coupled to the means for adjusting epipolar lines associated with the images such that the images are vertically aligned, means for removing image occlusion errors in the images; and
coupled to the means for removing image occlusion errors in the images, means for performing a matching analysis on the images;
wherein the images are a first original image and a second original image and have at least some overlap area, and wherein the means for adjusting epipolar lines further comprises:
means for creating a left and a right search column on at least one of the original images such that at least one of the created columns includes at least part of the overlap area;
coupled to the means for creating a left and right search column, means for creating two sets of gray-scale sub-images, one set of sub-images for each of the two original images;
coupled to the means for creating two sets of grayscale images, means for pairing the sub-images generated from the first original image with sub-images from the second original image such that a sub-image pair shares the same assigned color coordinate;
coupled to the means for pairing, means for running a matching algorithm on each of the points in the search column of each sub-image pair;
coupled to the means for running the matching algorithm, means for calculating vertical shift between points between points identified by the matching algorithm;
coupled to the means for calculating, means for selecting points with identical calculated vertical shift values; and
coupled to the means for selecting, means for aligning the points in the image that were not selected by the means for selecting by extrapolating the resulting calculated vertical shift values for each column.

15. The system of claim 14, wherein the means for creating search columns comprises:
means for creating one search column in a middle row of the first image;
coupled to the means for creating, means for executing the matching algorithm on at least one point within the search column such that the point is matched with at least one point in the second image;
coupled to the means for executing the algorithm, means for calculating at least one average horizontal shift value for points located by the matching algorithm; and
coupled to the means for calculating, means for using the calculated value to generate a linear equation.

16. A system for evaluating stereo images of an eye fundus, comprising:
means for obtaining at least two images;
coupled to the means for obtaining at least two images, means for correcting illumination errors in the images;
coupled to the means for correcting illumination errors in the images, means for adjusting epipolar lines associated with the images such that the images are vertically aligned;
coupled to the means for adjusting epipolar lines associated with the images such that the images are vertically aligned, means for removing image occlusion errors in the images; and
coupled to the means for removing image occlusion errors in the images, means for performing a matching analysis on the images;
wherein the images are a first original image and a second original image and have at least some overlap area, and wherein the means for removing image occlusion errors in the images further comprises:
a storage device for storing the images and executable code;
coupled to the storage device, means for selecting a first point within the overlap area in the right image;
coupled to the storage device, means for running a first correspondence search using the first point to find a first matching point in the left image;
coupled to the storage device, means for running a second correspondence search on the first matching point to find a second matching point in the right image; and
means for selecting match points using the first matching point and the second matching point.

* * * * *

UNITED STATES PATENT AND TRADEMARK OFFICE
CERTIFICATE OF CORRECTION

PATENT NO. : 6,714,672 B1
DATED : March 30, 2004
INVENTOR(S) : A. Berestov and H. Garland It is certified that error appears in the above-identified patent and that said Letters Patent is hereby corrected as shown below:

<u>Title page,</u>
Item [57], ABSTRACT,
Line 12, "preformed" should read -- performed --.

<u>Column 9,</u>
Line 52, "devices 104" should read -- device 104 --.

<u>Column 10,</u>
Line 32, "in" should be deleted.

<u>Column 11,</u>
Line 9, "so" should read -- some --.
Line 20, "2b)" should read -- 2b, --.

<u>Column 14,</u>
Line 23, "map 1210" should read -- map 1200 --.
Line 36, "maps 1200" should read -- map 1200 --.

<u>Column 16,</u>
Line 19, "sub-matches" should read -- sub-image matches --.

<u>Column 22,</u>
Line 63, "anywere" should read -- anywhere --.

<u>Column 23,</u>
Line 11, "from mx+b," should read -- form mx+b, --.

Signed and Sealed this

Twenty-third Day of November, 2004

JON W. DUDAS
*Director of the United States Patent and Trademark Office*